(12) United States Patent
Fukumoto

(10) Patent No.: US 6,829,205 B2
(45) Date of Patent: Dec. 7, 2004

(54) OPTICAL PICKUP, TILT DETECTION APPARATUS, TILT DETECTION METHOD AND OPTICAL DISK APPARATUS

(75) Inventor: Atsushi Fukumoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 461 days.

(21) Appl. No.: 09/779,608

(22) Filed: Feb. 9, 2001

(65) Prior Publication Data

US 2001/0046194 A1 Nov. 29, 2001

(30) Foreign Application Priority Data

Feb. 10, 2000 (JP) ........................................ 2000-038263

(51) Int. Cl.$^7$ ................................................ G11B 7/00
(52) U.S. Cl. ................................ 369/53.14; 369/44.32; 369/53.19; 369/44.37
(58) Field of Search ........................... 369/53.35, 44.26, 369/44.12, 109.01, 112.04, 44.41, 112.12, 112.02, 44.23, 44.32, 53.19, 118, 53.14, 44.37, 44.25

(56) References Cited

U.S. PATENT DOCUMENTS

| 5,065,380 A | | 11/1991 | Yokota ..................... 369/44.12 |
| 5,322,993 A | * | 6/1994 | Ohyama ..................... 369/118 |
| 5,450,387 A | * | 9/1995 | Ono et al. ................ 369/44.26 |
| 5,627,812 A | | 5/1997 | Yamamoto et al. .... 369/112.04 |
| 5,657,303 A | * | 8/1997 | Namoto et al. .......... 369/44.32 |
| 5,751,680 A | * | 5/1998 | Ishibashi et al. ........ 369/109.01 |
| 5,768,232 A | | 6/1998 | Muramatsu et al. ...... 369/53.35 |
| 5,828,634 A | | 10/1998 | Ohno et al. ............... 369/44.26 |
| 6,125,087 A | * | 9/2000 | Ohnishi et al. ........... 369/44.23 |
| 6,400,664 B1 | * | 6/2002 | Shimano et al. .......... 369/44.37 |
| 6,510,111 B2 | * | 1/2003 | Matsuura .................. 369/44.32 |
| 6,532,202 B1 | * | 3/2003 | Wada et al. ............. 369/112.02 |

FOREIGN PATENT DOCUMENTS

| EP | 0 351 953 | 1/1990 |
| EP | 0 357 323 | 3/1990 |

* cited by examiner

Primary Examiner—William Korzuch
Assistant Examiner—Kim-Kwok Chu
(74) Attorney, Agent, or Firm—Oblon, Spivak, McClelland, Maier & Neustadt, P.C.

(57) ABSTRACT

A tilt detection apparatus capable of detecting the tilt of the optical disk, provided with a laser for outputting a laser beam, a diffraction grating for diffracting the laser beam from said laser to generate a 0th order diffraction beam and +-first order diffraction beams which have the phase distribution equal to the phase distribution due to the wave front aberration generated on an optical disk when the optical disk is tilted, an objective lens for collecting said diffraction beams and exposing the beams to the optical disk, a photodetector for generating signals corresponding to said +-first order diffraction beams reflected at said optical disk, a signal generation circuit for generating the push-pull signals based on the generated signals, and a tilt detection circuit for detecting the tilt of the optical disk based on the push-pull signals.

25 Claims, 17 Drawing Sheets

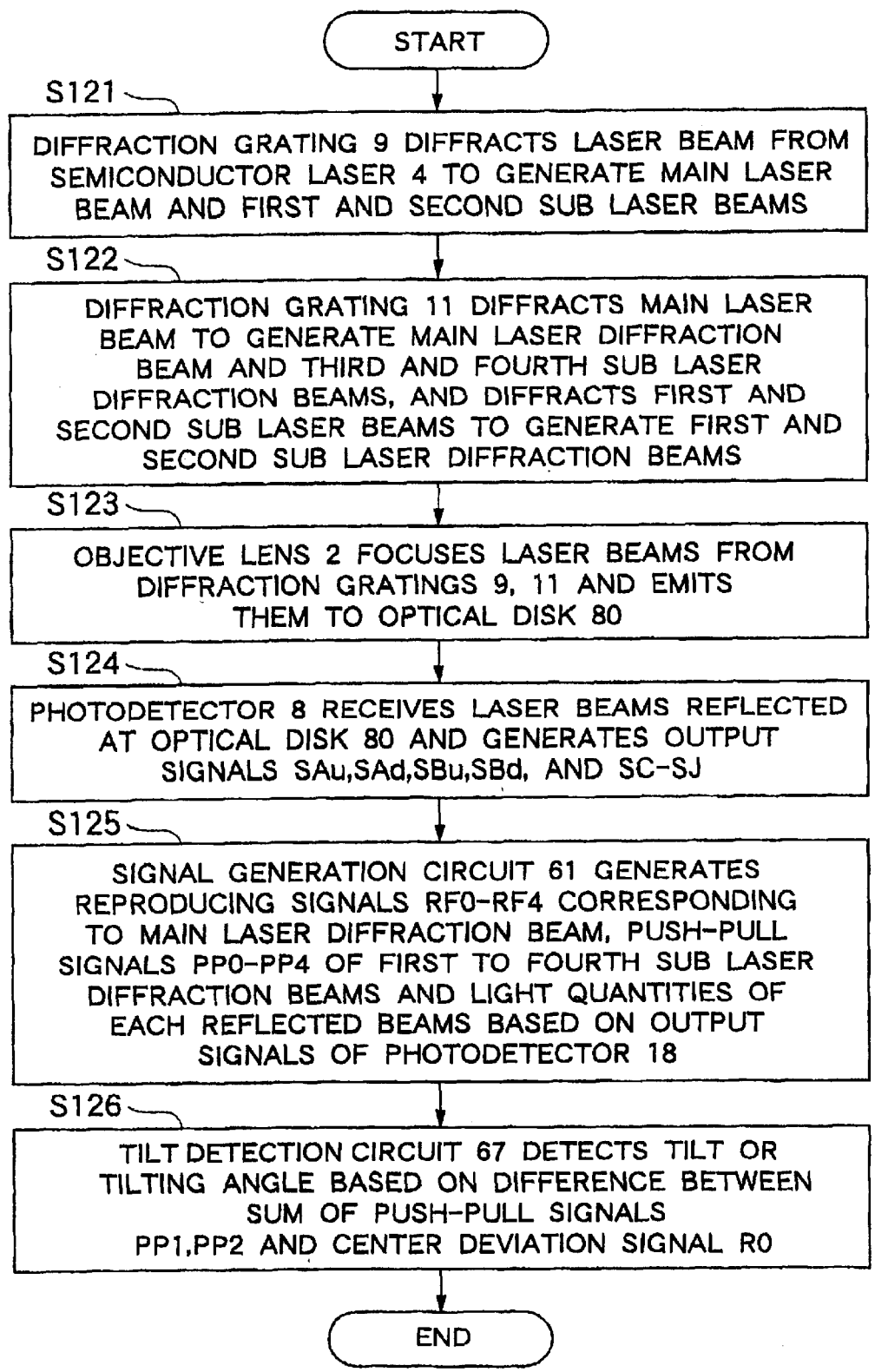

OPTICAL PICKUP, TILT DETECTION APPARATUS, TILT DETECTION METHOD AND OPTICAL DISK APPARATUS

BACKGROUND OF THE INVENTION

1. Field of the Invention

The present invention relates to an optical pickup for exposing a laser beam passed through a diffraction grating to an optical disk, a tilt detection apparatus, a tilt detection method for detecting a tilt of the optical disk, and an optical disk apparatus.

2. Description of the Related Art

In the optical disk apparatus, when a tilt exists on the optical disk, the deterioration of the signal quality of a recording signal and/or a reproducing signal of the optical disk may be occurred. For correcting the tilt of the optical disk, it is necessary to detect the tilt of the optical disk and generate a signal in response to the tilt.

An invention of an optical pickup is disclosed in Japanese Unexamined Patent Publication (Kokai) No.9-128785. In this Publication, in an optical pickup comprising a laser beam source, an objective lens and an aberration correction use liquid crystal panel, it is disclosed to change the refractive index of the liquid crystal panel in response to the thickness or the tilting angle of the liquid crystal panel.

Further, it is disclosed that a tilt sensor detects the tilting angle and a liquid crystal panel control circuit drives the liquid crystal panel to change the refractive index based on the tilting angle.

In the optical pickup of said Publication No.9-128785, the position for arranging the tilt sensor is restricted, and, in the optical disk, a point to which the laser beam is exposed is different from a point where the tilt sensor detects the tilt, and thus it is difficult to detect the tilt of the optical disk precisely.

SUMMARY OF THE INVENTION

An object of the present invention is to provide a tilt detection apparatus and a tilt detection method capable of detecting a tilt of an optical disk.

Further, another object of the present invention is to provide an optical pickup applicable in said tilt detection apparatus.

Further, still another object of the present invention is to provide an optical disk apparatus.

A first optical pickup according to the present invention comprises a laser for outputting a laser beam; a diffraction grating for diffracting the laser beam from said laser to generate a 0th order diffraction beam and +-first order diffraction beams; an objective lens for collecting said 0th order diffraction beam and said +-first order diffraction beams and exposing the beams to an optical disk on which track guide grooves are formed; and a photodetector for generating signals in response to said +-first order diffraction beams reflected at said optical disk, and each of said +-first order diffraction beams exposed to said optical disk has the phase distribution equal to or substantially equal to the phase distribution due to the wave front aberration generated on said optical disk when said optical disk is tilted, and said photodetector comprises light receiving portions for receiving each of said +-first order diffraction beams reflected at said optical disk, and each of said light receiving portions is divided in the direction in response to the track direction on said optical disk.

In the first optical pickup according to the present invention, preferably, said objective lens collects said 0th order diffraction beam and exposes it to the track of said optical disk, and a distance from the center part of the optical spot of said 0th order diffraction beam to the center part of the optical spots of said +-first order diffraction beams in the disk radial direction is, where n is an integer of 0 or more, equal to or approximately equal to a $(n/2+¼)$ times of the pitch of said track or said track guide groove.

In the first optical pickup according to the present invention, preferably, said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

In the first optical pickup according to the present invention, preferably, it further comprises an actuator for moving said objective lens in the disk radial direction in response to an eccentricity of said optical disk, and a position sensor for detecting the quantity of movement or the quantity of change of said objective lens.

A second optical pickup according to the present invention comprises a laser for outputting a laser beam, a first diffraction grating for diffracting the laser beam from said laser to generate a main laser beam including a 0th order diffraction beam and first and second sub laser beams including one of +-first order diffraction beams, a second diffraction grating for diffracting said main laser beam to generate a main laser diffraction beam including a 0th order diffraction beam and third and forth sub laser diffraction beams including one of +-first order diffraction beams and diffracting said first and second sub laser beams to generate first and second sub laser diffraction beams including a 0th order diffraction beam, an objective lens for collecting said main laser diffraction beams and said first to forth sub laser diffraction beams and exposing the beams to an optical disk on which track guide grooves are formed, and a photodetector for generating signals in response to said main laser diffraction beams and said first to forth sub laser diffraction beams reflected at said optical disk, and each of said first and second sub laser diffraction beams exposed to said optical disk has the phase distribution equal to or substantially equal to the phase distribution due to the wave front aberration generated on said optical disk when said optical disk is tilted.

In the second optical pickup according to the present invention, preferably, said objective lens collects said main laser diffraction beam and exposes it to the track of said optical disk, and a distance from the center part of the optical spot of said main laser diffraction beam to the center part of the optical spots of said first and second sub laser diffraction beams in the disk radial direction is, where n is an integer of 0 or more, equal to or approximately equal to a $(n/2+¼)$ times of the pitch of said track or said track guide groove.

In the second optical pickup according to the present invention, preferably, a distance from the center part of the optical spot of said main laser diffraction beam to the center part of the optical spots of said third and forth sub laser diffraction beams in the disk radial direction is, when m is an integer of 0 or more, equal to or approximately equal to a $(m+½)$ times of the pitch of said track or said track guide groove.

In the second optical pickup according to the present invention, preferably, said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

In the second optical pickup according to the present invention, preferably, said photodetector comprises light receiving portions for receiving each of said main laser diffraction beam and said first to forth sub laser diffraction beams reflected at said optical disk, and each of said light receiving portions is divided in the direction in response to the track direction on said optical disk.

In the second optical pickup according to the present invention, for example, it may be made the configuration which said wave front aberration is the coma aberration generated at a transparency substrate of said optical disk.

A first tilt detection apparatus according to the present invention comprises a laser for outputting a laser beam, a diffraction grating for diffract the laser beam from said laser to generate a 0th order diffraction beam and +-first order diffraction beams, an objective lens for collecting said 0th order diffraction beam and +-first order diffraction beams and exposing the beams to the optical disk on which track guide grooves are formed, a generating circuit for generating push-pull signals of said +-first order diffraction beams reflected at said optical disk, and a detection circuit for detecting a tilt of said optical disk based on the sum of the push-pull signals of said +-first order diffraction beams, and each of said +-first order diffraction beams exposed to said optical disk has the phase distribution equal to or substantially equal to the phase distribution due to the wave front aberration generated on said optical disk when said optical disk is tilted.

In the first tilt detection apparatus according to the present invention, preferably, said objective lens collects said 0th order diffraction beam and exposes it to the track of said optical disk, and a distance from the center part of the optical spot of said 0th order diffraction beam to the center part of the optical spots of said +-first order diffraction beams in the disk radial direction is, where n is an integer of 0 or more, equal to or approximately equal to a $(n/2+¼)$ times of the pitch of said track or said track guide groove.

In the first tilt detection apparatus according to the present invention, preferably, said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

In the first tilt detection apparatus according to the present invention, preferably, it further comprises a photodetector, said photodetector comprises light receiving portions for receiving each of said +-first order diffraction beams reflected at said optical disk, and each of said light receiving portions is divided in the direction in response to the track direction on said optical disk, and said generating circuit generates the push-pull signals of said +-first order diffraction beams based on the output signals from said light receiving portions of said photodetector.

In the first tilt detection apparatus according to the present invention, preferably, it further comprises an actuator for moving said objective lens in the disk radial direction in response to an eccentricity of said optical disk, and a position sensor for detecting the quantity of movement or the quantity of change of said objective lens, and said detection circuit generates an eccentricity signal in response to the eccentricity of said optical disk based on said quantity of movement or the quantity of change detected by said position sensor and detecting a tilt of said optical disk based on the deference between the sum of the push-pull signals of said +-first order diffraction beams and said eccentricity signal.

A second tilt detection apparatus according to the present invention comprises a laser for outputting a laser beam, a first diffraction grating for diffracting the laser beam from said laser to generate a main laser beam including a 0th order diffraction beam and first and second sub laser beams including one of +-first order diffraction beams, a second diffraction grating for diffracting said main laser beam to generate a main laser diffraction beam including a 0th order diffraction beam and third and forth sub laser diffraction beams including one of +-first order diffraction beams and diffracting said first and second sub laser beams to generate first and second sub laser diffraction beams including a 0th order diffraction beam, an objective lens for collecting said main laser diffraction beam and said first to forth sub laser diffraction beams and exposing the beams to an optical disk on which track guide grooves are formed, a generating circuit for generating push-pull signals of said main laser diffraction beam and said first to forth sub laser diffraction beams reflected at said optical disk, and a detection circuit for generating an eccentricity signal in response to the eccentricity of said optical disk based on the push-pull signals of said main laser diffraction beam and said third and forth sub laser diffraction beams and detecting a tilt of said optical disk based on the deference between the sum of the push-pull signals of said first and second sub laser diffraction beams and said eccentricity signal, and each of said first and second sub laser diffraction beams exposed to said optical disk has the phase distribution equal to or substantially equal to the phase distribution due to the wave front aberration generated on said optical disk when said optical disk is tilted.

In the second tilt detection apparatus according to the present invention, preferably, said objective lens collects said main laser diffraction beam and exposes it to the track of said optical disk, and a distance from the center part of the optical spot of said main laser diffraction beam to the center part of the optical spots of said first and second sub laser diffraction beams in the disk radial direction is, where n is an integer of 0 or more, equal to or approximately equal to a $(n/2+¼)$ times of the pitch of said track or said track guide groove.

In the second tilt detection apparatus according to the present invention, further preferably, a distance from the center part of the optical spot of said main laser diffraction beam to the center part of the optical spots of said third and forth sub laser diffraction beams in the disk radial direction is, when m is an integer of o or more, equal to or approximately equal to a $(m+½)$ times of the pitch of said track or said track guide groove.

In the second tilt detection apparatus according to the present invention, preferably, said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

In the second tilt detection apparatus according to the present invention, preferably, it further comprises a photodetector, and said photodetector comprises light receiving portions for receiving each of said main laser diffraction beams and said first to forth sub laser diffraction beams reflected at said optical disk, and each of said light receiving portions is divided in the direction in response to the track direction on said optical disk, and said generating circuit generates the push-pull signals of said main laser diffraction beam and said first to forth sub laser diffraction beams based on the output signals from said light receiving portions of said photodetector.

A first tilt detection method according to the present invention comprises the steps of diffracting a laser beam to generate a 0th order diffraction beam and +-first order diffraction beams and exposing said generated 0th order diffraction beam and +-first order diffraction beams to an optical disk on which the track guide grooves are formed, generating push-pull signals of said +-first order diffraction beams reflected at said optical disk, and detecting the tilt of said optical disk based on the sum of the push-pull signals of said +-first order diffraction beams, and each of said +-first order diffraction beams reflected at said optical disk has the phase distribution equal to or substantially equal to the phase distribution due to the wave front aberration generated on said optical disk when said optical disk is tilted.

In the first tilt detection method according to the present invention, preferably, said exposing step has the steps of collecting said 0th order diffraction beam and +-first order diffraction beams and exposing said 0th order diffraction beam to the track of said optical disk, and a distance from the center part of the optical spot of said 0th order diffraction beam to the center part of the optical spots of said +-first order diffraction beams in the disk radial direction is, where n is an integer of 0 or more, equal to or approximately equal to a $(n/2+\frac{1}{4})$ times of the pitch of said track or said track guide groove.

In the first tilt detection method according to the present invention, preferably, said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

In the first tilt detection method according to the present invention, preferably, ut further comprises the step of generating an eccentricity signal in response to the eccentricity of said optical disk, and said detecting step has a step of detecting the tilt of said optical disk based on the difference between the sum of the push-pull signals of said +-first order diffraction beams and said eccentricity signal.

A second tilt detection method according to the present invention comprises the steps of diffracting the laser beam to generate a main laser beam including a 0th order diffraction beam and first and second sub laser beams including one of +-first order diffraction beams, diffracting said main laser beam to generate a main laser diffraction beam including a 0th order diffraction beam and third and forth sub laser diffraction beams including one of +-first order diffraction beams and diffracting said first and second sub laser beams to generate first and second sub laser diffraction beams including a 0th order diffraction beam, exposing said main laser diffraction beam and said first to forth sub laser diffraction beams to an optical disk on which track guide grooves are formed, generating push-pull signals of said main laser diffraction beam and said first to forth sub laser diffraction beams reflected at said optical disk, and generating an eccentricity signal in response to the eccentricity of said optical disk based on the push-pull signals of said main laser diffraction beam and said third and forth sub laser diffraction beams and detecting a tilt of said optical disk based on the deference between the sum of the push-pull signals of said first and second sub laser diffraction beams and said center eccentricity signal, and each of said first and second sub laser diffraction beams exposed to said optical disk has the phase distribution equal to or substantially equal to the phase distribution due to the wave front aberration generated on said optical disk when said optical disk is tilted.

In the second tilt detection method according to the present invention, preferably, said exposing step has a step of collecting said main laser diffraction beam and said first to forth sub laser diffraction beams and exposing said main laser diffraction beam to the track of said optical disk, and a distance from the center part of the optical spot of said main laser diffraction beam to the center part of the optical spots of said first and second sub laser diffraction beams in the disk radial direction is, where n is an integer of 0 or more, equal to or approximately equal to a $(n/2+\frac{1}{4})$ times of the pitch of said track or said track guide groove.

In the second tilt detection method according to the present invention, further preferably, a distance from the center part of the optical spot of said main laser diffraction beam to the center part of the optical spots of said third and forth sub laser diffraction beams in the disk radial direction is, when m is an integer of 0 or more, equal to or approximately equal to a $(m+\frac{1}{2})$ times of the pitch of said track or said track guide groove.

In the second tilt detection method according to the present invention, preferably, said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

An optical disk apparatus according to the present invention comprises an optical pickup for diffracting a laser beam from a laser, generating a 0 order diffraction beam and +-first order diffraction beams having the phase distribution equal to or approximately equal to the phase distribution due to the wave front aberration of an optical disk when the optical disk is tilted, exposing the 0 order diffraction beam and +-first order diffraction beams to the optical disk, and receiving reflected beams of said exposed beams from the optical disk to generate signals in response to each of the reflected signals, a signal generation circuit for generating push-pull signals of said received reflected beams of at least said +-first order diffraction beams, a tilt detection circuit for detecting the tilt of the optical disk based on the sum of said generated push-pull signals of said +-first order diffraction beams, and a tilt correction portion for correcting the tilt of the optical disk in response to said detected tilt.

In the first tilt detection apparatus according to the present invention mentioned above, the +−primary diffraction beams generated by the diffraction grating have a phase distribution equal to or nearly equal to the phase distribution due to the wave front aberration generated on the optical disk while the optical disk has a tilt.

By said phase distribution, the push-pull signal of one of the +−primary diffraction beams becomes the maximum value at the certain tilt angle (θ) and the push-pull signal of another of the +−primary diffraction beams becomes the minimum value at the certain tilt angle (−θ). By obtaining an additional signal as the result of addition of the push-pull signals of the +−primary diffraction beams, the value of the additional signal can be made 0 while the tilt angle of the optical disk is 0° and the symmetrical additional signal corresponding to the positive and negative tilt angles can be obtained, so that the tilt angle is detectable by the additional signal.

In the second tilt detection apparatus according to the present invention mentioned above, the first and second sub laser diffraction beams generated by the first and second diffraction gratings have a phase distribution equal to or substantially equal to the phase distribution due to the wave front aberration generated on the optical disk while the optical disk has a tilt.

By said phase distribution, the push-pull signal of one of the first and second sub laser diffraction beams becomes the maximum value at the certain tilt angle (θ) and the push-pull signal of another of the first and second sub laser diffraction beams becomes the minimum value at the certain tilt angle (−θ). By obtaining an additional signal as the result of addition of the push-pull signals of the first and second additional beams, the value of the additional signal can be made 0 while the tilt angle of the optical disk is 0° and the symmetrical additional signal corresponding to the positive and negative tilt angles can be obtained, so that the tilt angle is detectable by the additional signal.

BRIEF DESCRIPTION OF THE DRAWINGS

These and other objects and features of the present invention will become more clearer from the following description of the preferred embodiments with reference to the accompanying drawings, in which:

FIG. 17 is a flow-chart showing n the detection method for detecting the tilt in the radial direction of the optical disk in the tilt detection apparatus of the optical disk apparatus shown in FIG. 16.

DESCRIPTION OF THE PREFERRED EMBODIMENTS

Preferred embodiments of the present invention will be explained with reference to the attached drawings.

An optical disk apparatus generally comprises an optical pickup, collects a laser beam outputted from the semiconductor laser inside the optical pickup, and exposes it to the optical disk.

Figure 1A:
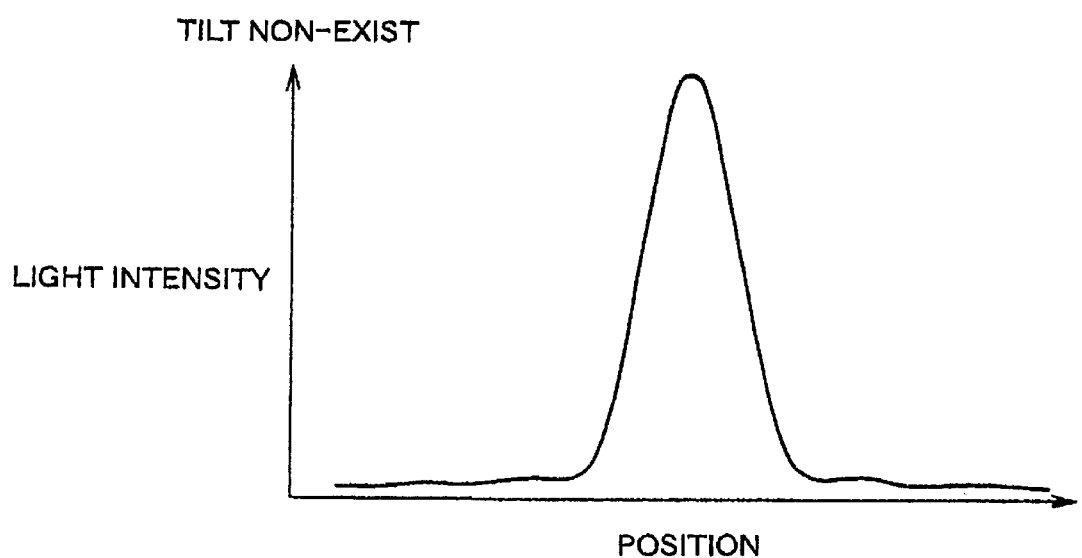
FIGS. 1A and 1B are views for explaining the relationship between the light intensity and the position of the light spot formed on the optical disk as an example.
Figure 1B:
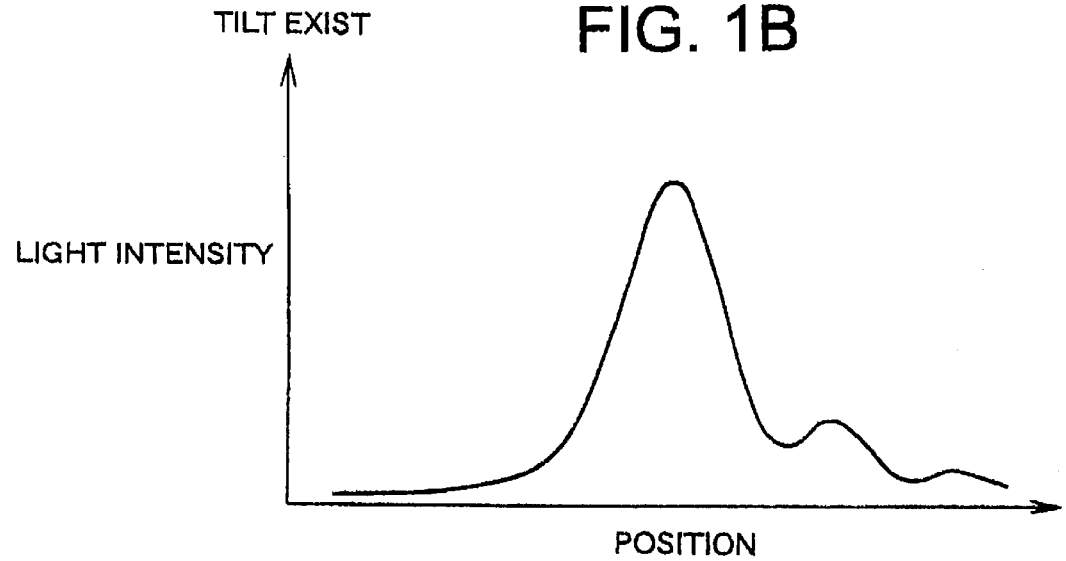

FIGS. 1A and 1B are views for explaining the relationship between the light intensity and the position of the light spots formed on the optical disk as an example. FIG. 1A is a view for showing the relationship between the light intensity and the position when the optical disk is not tilted (on track state) as an example. FIG. 1B is a view for explaining the relationship between the light intensity and the position when the optical disk is tilted as an example.

When the optical disk is tilted (inclined), the intensity of the center of the light spots becomes lower and the siderobe appears in the tilting direction. Further, due to the lowering of the intensity of the center of the light spot, the amplitude of the reproducing signal in response to the quantity of the reflected light is decreased, and thus the quality of the signal may deteriorates.

This is because, when the laser beam strikes a transparency substrate (disk substrate) of the tilted optical disk, the laser beam passed through the transparency substrate to the recording plane is effected, the spatial phase distribution, for example the phase distribution due to the wave front aberration, and the collecting performance of the light spot formed on the recording surface becomes lower.

Figure 2:
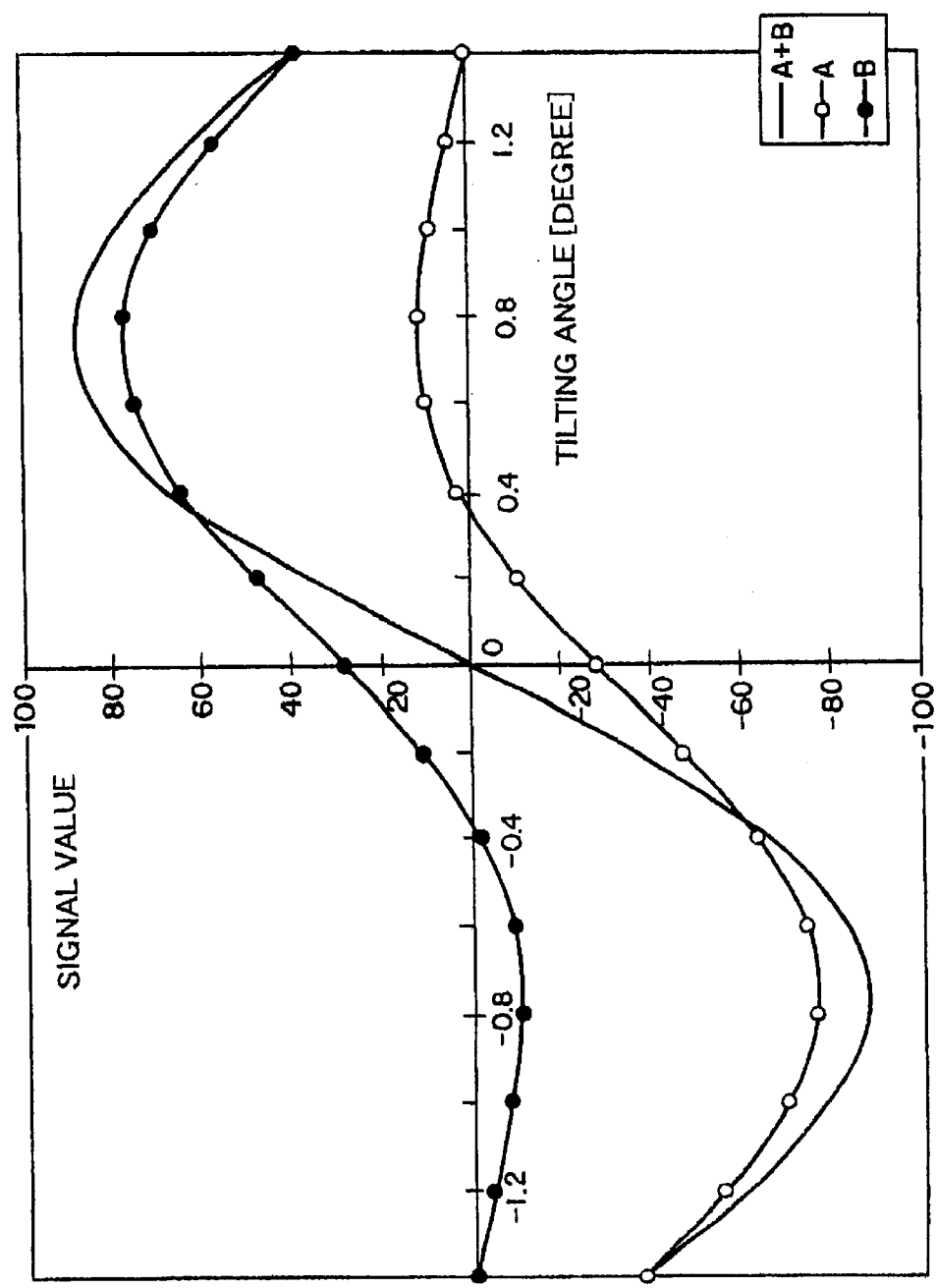
FIG. 2 is a view of the characteristics showing the relationship between the tilting angle in the disk radial direction and the sum of the push-pull signals of the +−first order diffraction beams.

When the phase distribution corresponding to the tilting angle θ is given to one laser beam in advance, the phase distribution corresponding to the tilting angle −θ is given to another laser beam in advance, and both the laser beams having equal light intensities, the reproduced push-pull signals obtained from each of the laser beams are shown by the characteristic curves A and B in FIG. 2. Then, by adding the both reproducing push-pull signals to generate the sum signal, the characteristic curve becomes (A+B), so that the tilt error signal in response to the tilts (or the tilting angle) of positive and negative can be obtained.

In the present embodiment, to detect a tilt of an optical disk, the phase distribution equal to or approximately equal to the phase distribution generated due to the tilt of the disk substrate in the disk radial direction is added to the laser beam by using the diffraction grating before the striking it to the optical disk.

In the optical pickup of the related art, the 0th order diffraction beam and the +-first order diffraction beams, generated by the laser beam passed through the diffraction grating, have a homogeneous or substantially homogeneous phase distribution in a propagation direction. The 0th order diffraction beam and the +-first order diffraction beams pass through the objective lens to form one main light spot and two sub light spots on the optical disk at the same time.

On the other hand, by forming the diffraction grating the specific pattern, the 0th order diffraction beam may have the homogeneous phase and the +-first order diffraction beams may be given the spatial phase distributions generated when they pass through the disk substrate tilting in positive direction and negative direction.

As the result, passing through the objective lens, one main light spot when the optical disk is not tilted and two sub light spots equal to or substantially equal to the case the positive and negative tilts exist, may be formed on the optical disk at the same time.

Here, by applying the computer hologram technology, the interference fringes formed on a screen by the laser beam striking the screen in a right angle and having a homogeneous phase distribution and laser beams striking the screen with the predetermined angle and direction to the above laser beam having the homogeneous phase distribution and having spatial phase distributions generated when they pass through the disk substrate tilting in positive direction or negative direction, can be obtained found by a computer.

Note that, the angle and direction of the two laser beams are matched to the angle and direction of the 0th order diffraction beam and the +-first order diffraction beams after passing through the diffraction grating in the case that the diffraction grating is mounted on the optical pickup.

First, the phase distribution of the laser beam passing through the tilted disk substrate is defined by the equations. The description by polynomial development of the wave front aberration is used for defining the equations.

By the polynomial development of the wave front aberration, the coma aberration is major part of the wave front aberration generated by the tilting transparency substrate.

When this coma aberration Wc is expressed by the following equation (1), where x is a position in the disk radial direction, and an orthogonal coordinate (x,y) standardized (normalized) by the aperture radius on the aperture plane of the objective lens.

$$Wc(x,y)=2\pi W_{11}x+2\pi W_{31}x(x^2+y^2)+2\pi W_{51}x(x^2+y^2)^2 \quad (1)$$

In the above equation (1), $W_{11}$ is a wave front coefficient for determining the position of the light spot formed on the optical disk, and since it doesn't influence the shape of the light spot, any value can be chosen.

Further, $W_{31}$ and $W_{51}$ are coma aberration coefficients $W_{31}(\lambda)$ and $W_{51}(\lambda)$ standardized (normalized) by the laser beam wavelength $\lambda$, and each of them is shown in the following equations (2) and (3).

$$W_{31}(\lambda)=\{(n^2-1)n^2tNA^3 \sin\theta \cos\theta\}/\{2\lambda(n^2-\sin^2\theta)^{5/2}\} \quad (2)$$

$$W_{51}(\lambda)=\{(n^2-1)n^2tNA^5(n^4+3n^2\cos^2\theta-5n^2\sin^2\theta+4\sin^2\theta-\sin^4\theta)\sin\theta\cos\theta\}/\{8\lambda(n^2-\sin^2\theta)^{9/2}\} \quad (3)$$

In the above equations (2) and (3), NA is a numerical aperture of the objective lens, $\lambda$ is a wavelength of the laser beam from the light source, n is the reflective index of the disk substrate, t is the thickness of the disk substrate, and $\theta$ is the tilting angle indicating the tilt of the disk substrate. The material of the disk substrate is, for example, the polycarbonate and its reflective index is about 1.5.

To the laser beam having the homogeneous phase distribution, the phase distribution Wd of the laser beam striking with the tilt of direction $\beta$ and the angle $\alpha$ to the laser beam having the homogeneous phase distribution is expressed by the equation (4), where x is a position in the disk radial direction and the orthogonal coordinate (x,y) standardized (normalized) by the aperture radius r on the aperture plane of the objective lens. Note, the tilt direction $\beta$ is 0 degree in a radial direction (or x direction) and 90 degree in a track direction.

$$Wd(x,y)=\{2\pi r(x\cos\beta+y\sin\beta)\sin\alpha\}/\lambda \quad (4)$$

Under the above conditions, the interference fringes appeared by the laser beam having the phase distribution of $\{Wc(x, y)+Wd(x, y)\}$ when $\lambda$ is a certain value and the laser beam with the homogeneous phase striking the screen vertically, is calculated.

Figure 3:
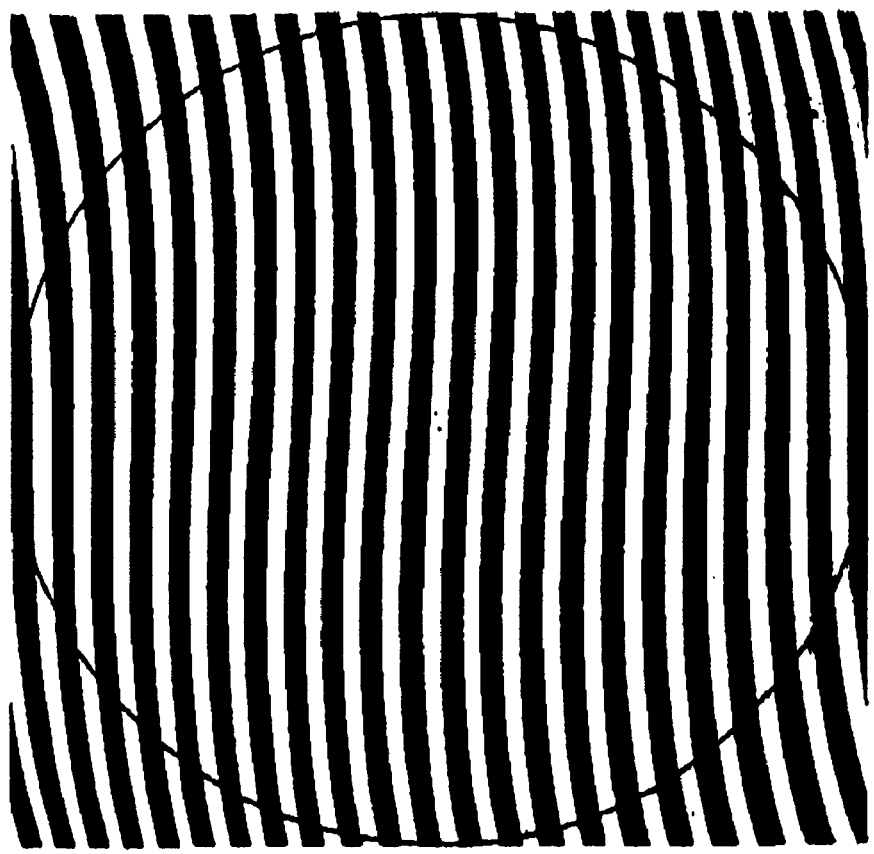
FIG. 3 is a view for explaining the interference fringes calculated using the computer hologram technology as an example.

FIG. 3 is a view for explaining the interference fringes calculated under the conditions of $\theta=1.0°$, $\alpha=0.2°$, and $\beta=90°$. Note that, NA=0.6, $\lambda$ 650 nm, t=0.6 mm, n=1.5, r=2 mm, and $W_{11}=-2W_{31}/3-W_{51}/2$ are set. Further, a ring in FIG. 3 corresponds to an aperture of the objective lens.

Via the processes that the interference fringes is considered the binary information concerning with lightness and darkness (the ration of lightness and darkness is 1:1) and the photomask is produced, and the grating is produced on the glass substrate using the produced photomask, the desired diffraction grating can be obtained.

Figure 4A:
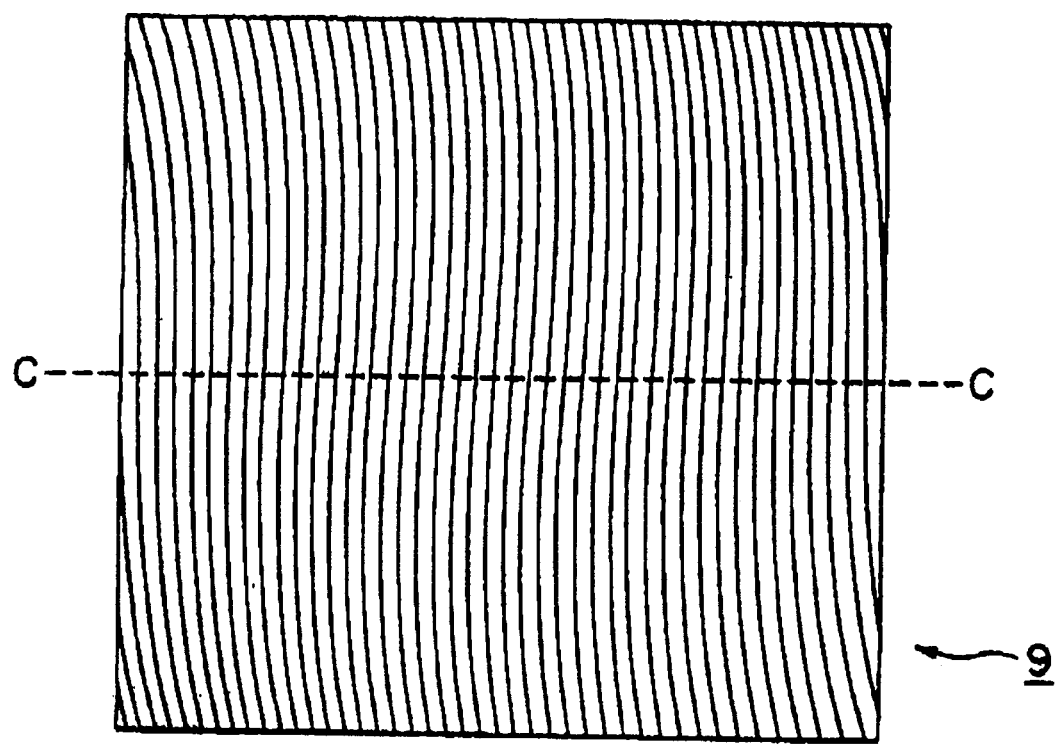
FIGS. 4A and 4B are views of the configuration of the diffraction grating formed the interference fringes shown in FIG. 3 as an example.
Figure 4B:
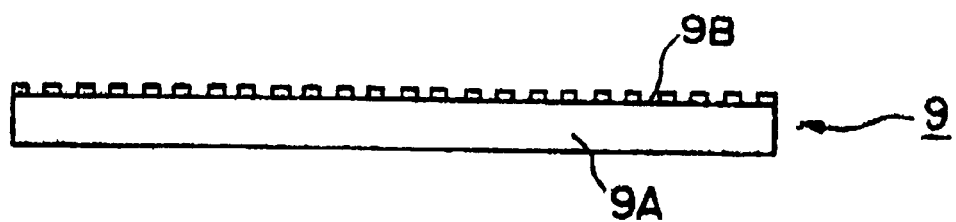

FIGS. 4A and 4B are views of the configuration of the diffraction grating produced based on the interference fringes shown in FIG. 3. FIG. 4A is a top view of the diffraction grating 9 and FIG. 4B is a sectional view showing the diffraction grating 9 sectioned at line C In the diffraction grating 9, the groove 9B such as undulating is formed on the glass substrate 9A. The depth of the groove 9B is determined based on the ratio of the light intensity between 0th order diffraction beam and +-first order diffraction beams.

The laser beam passed through the diffraction grating 9 produced by the process mentioned above, passing through the objective lens, forms three light spots on the optical disk.

The 0th order diffraction beam corresponds to the case that the tilt of the optical disk doesn't exist, one of the +-first order diffraction beams forms the light spot equivalent to or substantially equivalent to the case that the positive tilting angle $\theta$ is exist in the disk radial direction, and another of the +-first order diffraction beams forms the light spot equivalent to or substantially equivalent to the case that the negative tilting angle $(-\theta)$ is exist in the disk radial direction.

Figure 5:
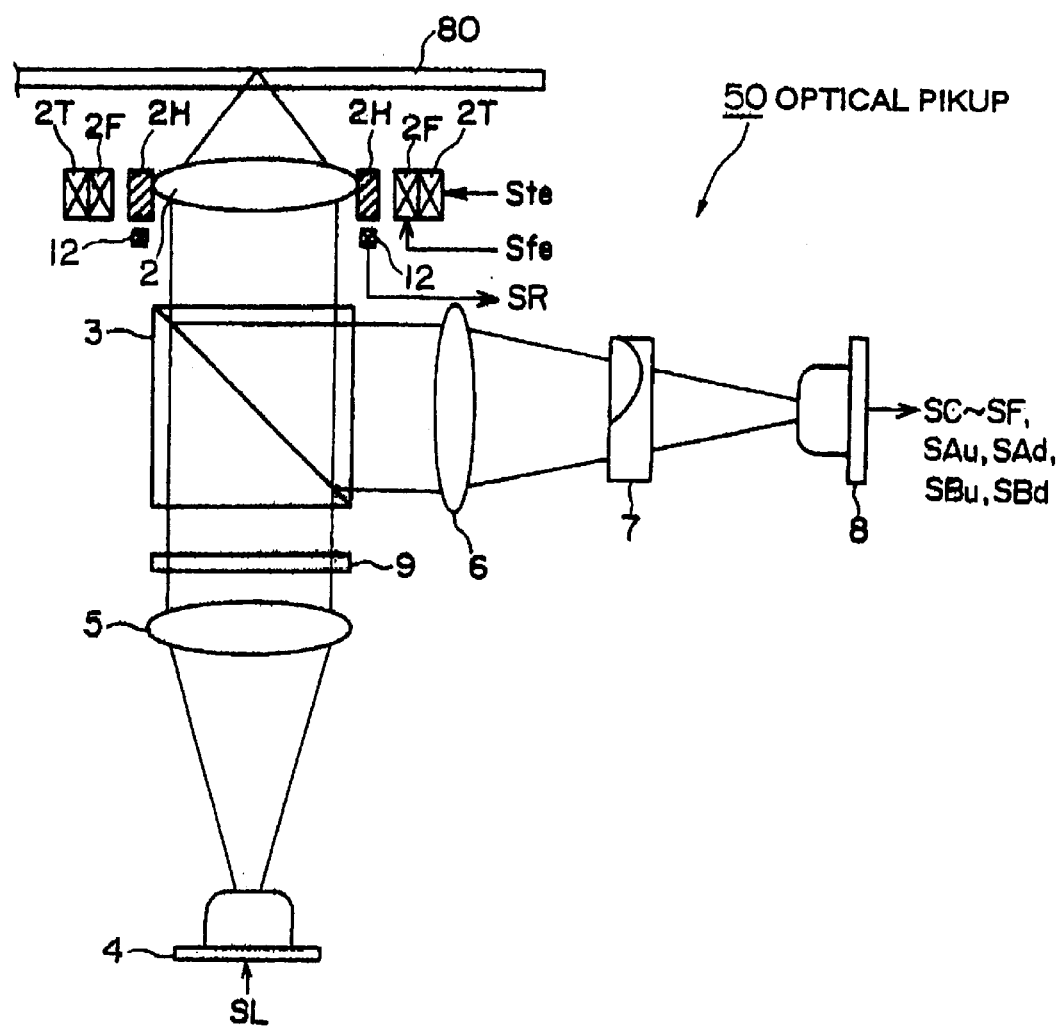
FIG. 5 is a schematic view of the configuration of the optical pickup comprising the diffraction grating shown in FIGS. 4A and 4B.

FIG. 5 is a view showing the configuration of the optical pickup comprising the diffraction grating 9.

This optical pickup 50 comprises a semiconductor laser 4, a collimator lens 5, a diffraction grating 9, a beam splitter 3, an object lens 2, a collecting lens 6, cylindrical lens 7, a photodetector 8, lens holders 2H, a focusing actuator 2F, a tracking actuator 2T, and a center point sensor 12.

The objective lens 2 is held by the lens holders 2H.

The focusing actuator 2F, based on the driving signal Sfe, transfers the lens holders 2H in the focusing direction which is vertical to the recording surface of the optical disk 80, so that it transfers the objective lens 2 in the focusing direction to realize the focus servo.

The tracking actuator 2T, based on the driving signal Ste, transfers the lens holders 2H in the radial direction of the optical disk 80, so that it transfers the objective lens 2 in the radial direction of the optical disk 80 to realize the tracking servo. Note that, when the eccentricity of (the rotation of) the optical disk 80 is exist, the tracking actuator 80 transfers the objective lens 2 in response to the eccentricity in the disk radial direction based on the same driving signal Ste.

The semiconductor laser 4 outputs a linearly polarized laser beam based on the driving signal SL and provides it for the collimator lens 5.

The collimator lens 5 collimates the laser beam from the semiconductor laser 4 and provided it for the diffraction grating 9.

The diffraction grating 9 divides the laser beam from the collimator lens 5 into the main laser beam including 0th order diffraction beam and the first and second sub laser beams including +-first order diffraction beams and provides these laser beams (the main laser beam and the first and second sub laser beams) for the beam splitter 3.

The beam splitter 3 passes through the laser beams from the diffraction grating 9 and provides them for the objective lens 2.

The objective lens 2 collects the laser beams from the beam splitter 3 and provides them for the track of the optical disk 80 forming lands and/or grooves. The optical disk 80, on which the track guide grooves are formed, is, for example, a compact disc (CD), a digital video disk (DVD), a phase change type optical disk (PD) and so on.

Further, the objective lens 2 returns the laser beams reflected at the optical disk 80 to the beam splitter 3.

The beam splitter 3, to which the laser beams from the objective lens 2 are exposed, reflects and outputs the exposed laser beams and provides them for the collecting lens 6.

The collecting lens 6 collects the laser beams from the beam splitter 3 and provides them for the cylinder-shaped lens (cylindrical lens) 7.

The cylindrical lens 7 makes the laser beams from the collecting lens 6 pass through and provides them for the photodetector 8.

The photodetector 8 receives the laser beams from the cylindrical lens 7 at the light receiving portion and generates output signals SAu, SAd, SBu, SBd, and SC–SF.

The center point sensor 12 is a position sensor, by detecting the quantity of the movement or the quantity of the change of the lens holders 2H in the disk radial direction, detects the quantity of the movement or the quantity of the change of the objective lens 2, and generates the detection signal SR indicating said detected quantity of the movement or said detected quantity of the change detected.

Figure 6:
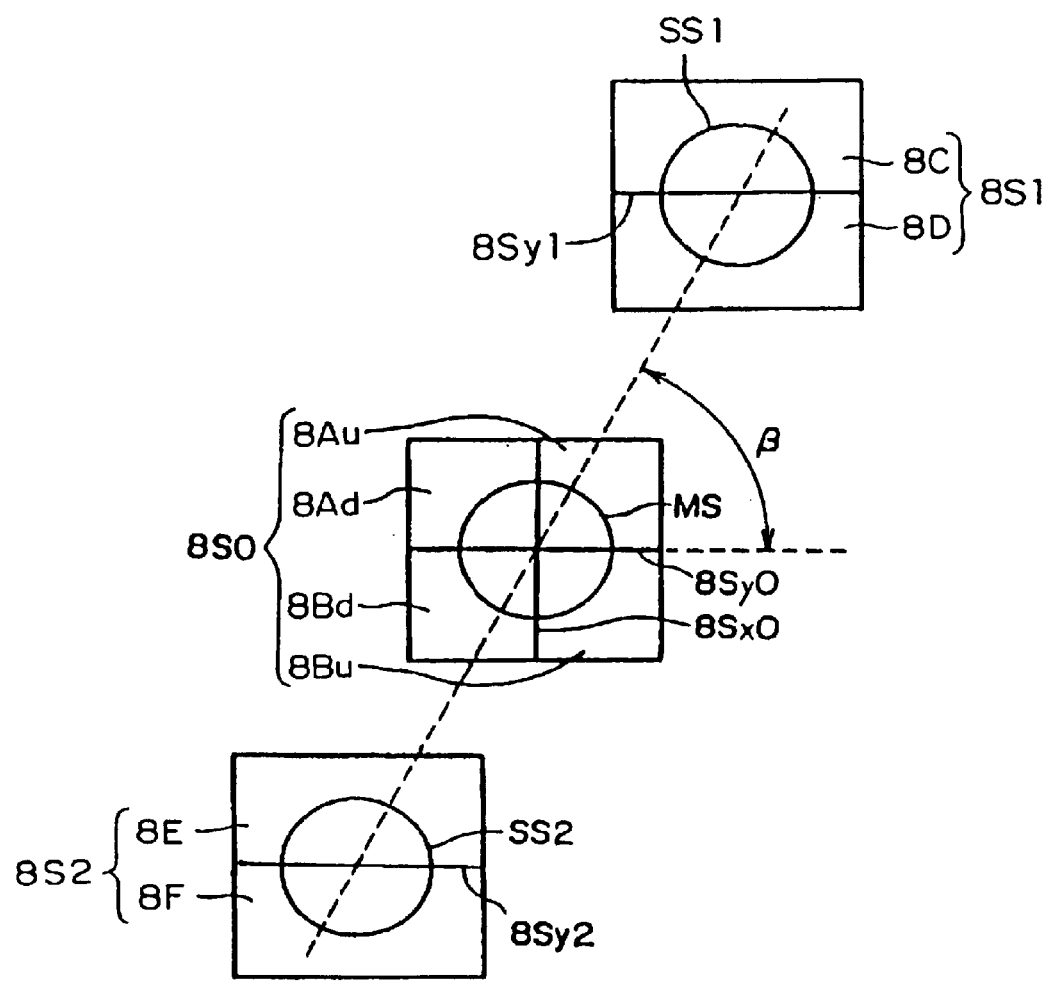
FIG. 6 is a schematic view of the configuration of the light receiving portion of the photodetector shown in FIG. 5.

FIG. 6 is a view showing the configuration of the light receiving portion of the photodetector 8 shown in FIG. 5.

The photodetector 8 comprises a main light receiving portion 8S0 and the first and second sub light receiving portions 8S1 and 8S2. Each of the light receiving portions 8S0–8S2 is divided in the direction in response to the track direction of the optical disk 80 and is divided as the push-pull signals in the disk radial direction or any signals in response to the push-pull signals are detectable.

The main light receiving portion 8S0 is divided into four of the same or approximately same parts by the two dividing lines 8Sx0, 8Sy0 crossing at right angle and comprises four division areas 8Au, 8Ad, 8Bu, 8Bd. In the main light receiving portion 8S0 shown in FIG. 6, the main light spot MS is formed by (the reflected light of) the main laser beam from the cylindrical lens 7.

The division area 8Au generates the output signal SAu in response to the light quantity (the reflected light quantity) of the main laser beam provided for the area 8Au.

The division area 8Ad generates the output signal SAd in response to the light quantity of the main laser beam provided for the area 8Ad.

The division area 8Bu generates the output signal SBu in response to the light quantity of the main laser beam provided for the area 8Bu.

The division area 8Bd generates the output signal SBd in response to the light quantity of the main laser beam provided for the area 8Bd.

The direction of the optical axis of the cylindrical lens 7 is at an angle of about 45° or about 135° to the direction of the dividing line 8Sx0 or the dividing line 8Sy0 of the main light receiving portion 8S0. The dividing line 8Sy0 (or the dividing line 8Sx0) of the main light receiving portion 8S0 for which the main laser beam reflected at the optical disk 80 is provided is parallel or approximately parallel to the track direction of the optical disk 80, and divides the main light receiving portion 8S0 into two of the same or approximately same parts.

The cross point of the dividing lines 8Sx0 and 8Sy0 is in the center part or in the approximately center part of the main laser beam passing through the cylindrical lens 7.

The shape of the light spot MS formed at the main light receiving portion 8S0 changes diagonally in accordance with the distance between the optical disk 80 and the objective lens 2, so that the focus eccentricity at the optical disk 80 is detectable based on the output signals SAu, SAd, SBu, and SBd generated by the division areas 8Au, 8Ad, 8Bu and 8Bd using the astigmatic method. Note that, the angle defined by the line formed by the centers of the light receiving portions 8S0–8S2 and the dividing line 8Sy0 corresponds to said direction β.

The first sub light receiving portion 8S1 is divided two of the same or approximately same parts by the dividing line 8Sy1 and comprises two division areas 8C, 8D. In the first sub light receiving portion 8S1 show in FIG. 6, the sub light spot SS1 is formed by (the reflected light of) the first sub laser beam from the cylindrical lens 7.

The division area 8C generates the output signal SC in response to the light quantity (the reflected light quantity) of the sub laser beam provided for the area 8C. The division area 8D generates the output signal SD in response to the light quantity (the reflected light quantity) of the sub laser beam provided for the area 8D.

The center part of the first sub light receiving portion 8S1 is in the center or approximately center of the first sub laser beam passing through the cylindrical lens 7.

The second sub light receiving portion 8S2 is divided two of the same or approximately same parts by the dividing line 8Sy2 and comprises two division areas 8E, 8F. In the first sub light receiving portion 8S1 show in FIG. 6, the sub light spot SS2 is formed by (the reflected light of) the second sub laser beam from the cylindrical lens 7.

The division area 8E generates the output signal SE in response to the light quantity (the reflected light quantity) of the sub laser beam provided for the area 8E. The division area 8F generates the output signal SF in response to the light quantity (the reflected light quantity) of the sub laser beam provided for the area 8F.

The center part of the second sub light receiving portion 8S2 is in the center or approximately center of the second sub laser beam passing through the cylindrical lens 7. The dividing lines 8Sy0–8Sy42 are parallel or approximately parallel each other.

Figure 7:
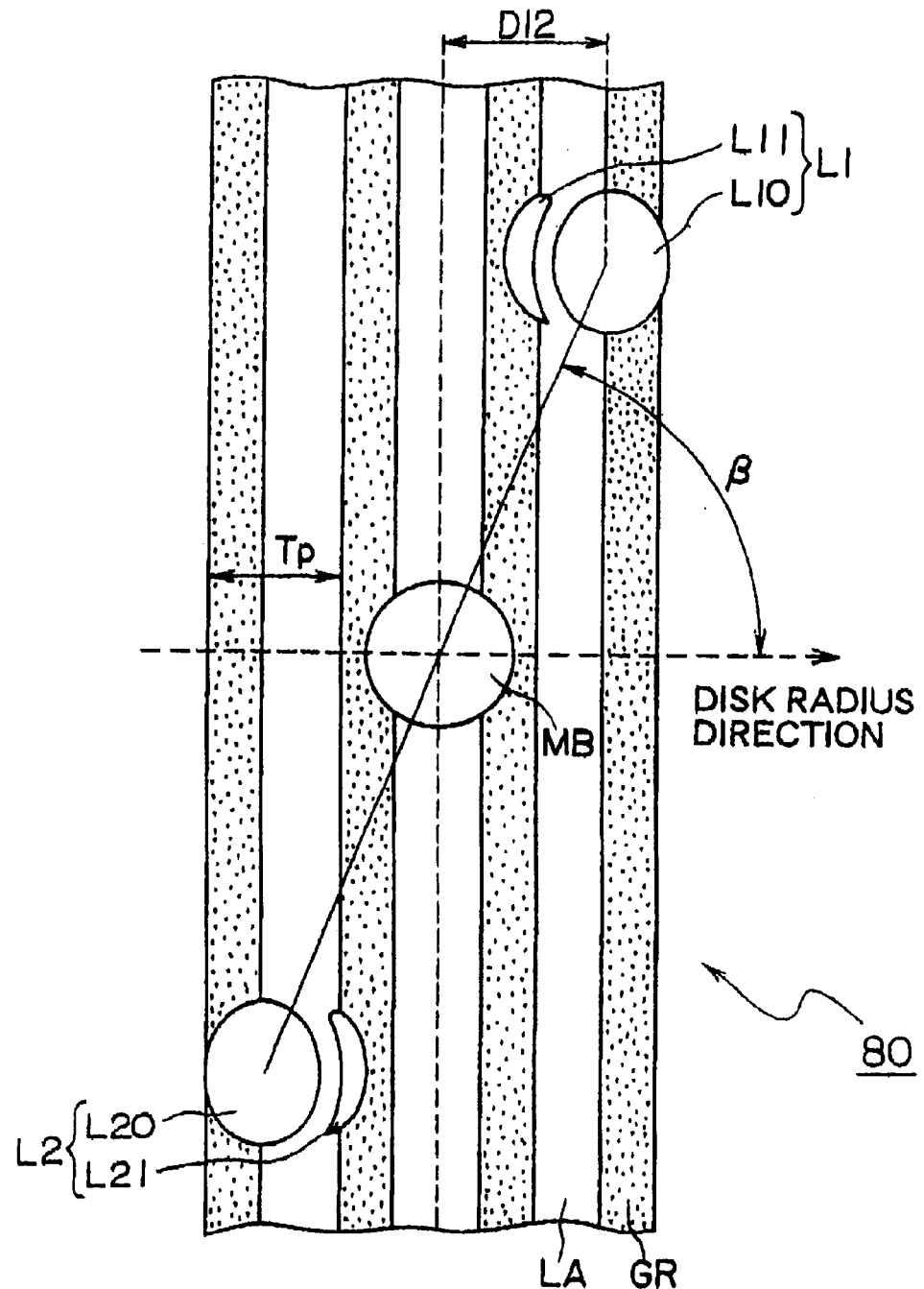
FIG. 7 is a view for explaining the arrangement of the light spots on the recording plane of the optical disk.

FIG. 7 is a view for explaining the arrangement of the light spots on the recording side of the optical disk.

On the recording side of the optical disk 80, the land LA and the groove GR are formed and the groove GR forms a track guide groove.

On the recording side of the optical disk 80, the main light spot MB by the main laser beam having a large quantity of light and the first and second sub light spots L1 and L2 by the first and second sub laser beam having a small quantity of light are formed.

The first sub light spot L1 comprises the spot L10 corresponding to the mainrobe and the spot L11 corresponding to the siderobe.

The second sub light spot L2 comprises the spot L20 corresponding to the mainrobe and the spot L21 corresponding to the siderobe.

The main laser beam is reflected at the main light spot MB and provided for the main light receiving portion 8S0 of the photodetector 8.

The first sub laser beam is reflected at the first sub light spot L1 and provided for the first sub light receiving portion 8S1 of the photodetector 8. The center of the sub laser beam reflected at the spot L1 is in the center or approximately center of the first sub light receiving portion 8S1.

The second sub laser beam is reflected at the second sub light spot L2 and provided for the second sub light receiving portion 8S2 of the photodetector 8. The center of the sub laser beam reflected at the spot L2 is in the center or approximately center of the second sub light receiving portion 8S2.

The light receiving portion 8S0–8S2 of the photodetector 8 have the configuration which can detects the push-pull signals in the disk radial direction by the dividing lines 8Sy0–8Sy2.

The position of two of the sub light spots L1 and L2 on the recording surface of the optical disk 80 are, preferably, when the main light spot MB is on the track (for example, when the center part of the main light spot MB is in the center part of the track), at the position that when one of the push-pull signals (SC−SD, SE−SF) is the maximum value, another of the push-pull signals becomes the minimum value.

The distances from the main light spot MB to two of the sub light spots L1 and L2 on the optical disk 80 are same and determined by the angle a mentioned above.

Further, when the two sub light spots L1 and L2 are at the desired positions, the direction β is formed as the phase distribution, which are equal to or approximately equal to the phase distribution generated to the two sub light spots L1 and L2 by the tilt of the disk substrate in the disk radial direction, are given.

Namely, the distances D12 from the center part of the main light spot MB to the center parts of the two sub light spots L1 and L2 in the disk radial direction is expressed in the next equation (5) by using the pitch Tp of the grooves GR (or the track pitch) and an integer n of 0 or more.

$$D12 = (n/2 + \frac{1}{4})Tp \quad (5)$$

Especially, in the case the land groove configuration whose ratio of the width of the land LA and groove GR is 1:1, the center parts of the sub light spots L1 and L2 are arranged at the boundary or the approximately boundary between the land LA and the groove GR.

The tilt error signal TS indicating the tilt of the optical disk 80 can be obtained from the sum (PP1+PP2) of the push-pull signals PP1 and PP2 obtained from the output signals of the first and second sub light receiving part 8S2, 8S2 shown in FIG. 6.

The push-pull signal of first sub laser beam is PP1=SC−SD, the push-pull signal of the second sub laser beam is PP2=SE−SF, and the tilting error signal is expressed by the next equation (6).

$$TS = (SC - SD) + (SE - SF) \quad (6)$$
$$= PP1 + PP2$$

Note that, the push-pull signal PP0 obtained from the output signal of the main light receiving portion 8S0 is PP0=SAu+SAd−SBu−SBd and useable as the tracking error signal TE.

Figure 8:
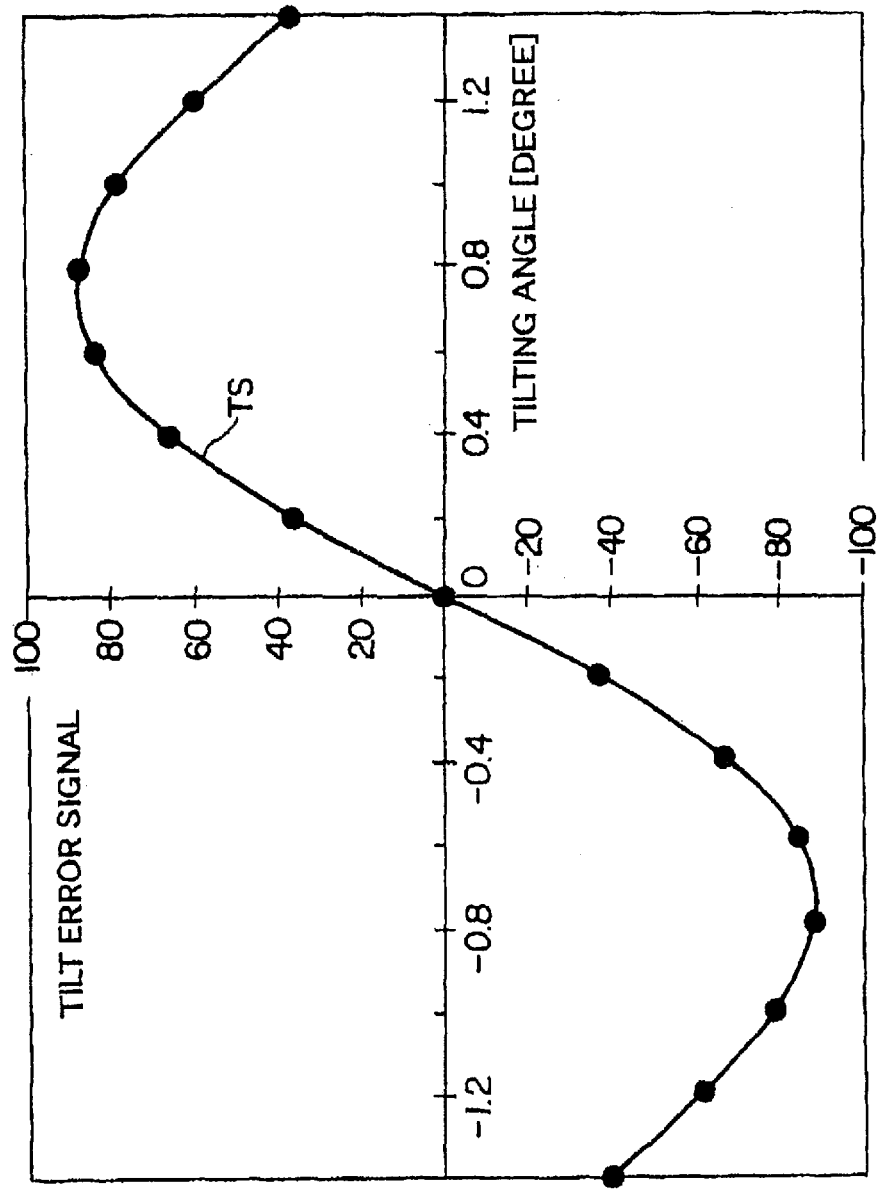
FIG. 8 is a view for explaining the relationship between the tilt error signal TS and the tilting angle, especially when the tracking error is not exist (on track state)

FIG. 8 is a view for explaining the relationship between the tilt error signal TS and the tilting angle.

Here, the values of each parameters are like this θ=0.75°, NA=0.6, λ=405 nm, t=0.6 mm and Tp=0.7μm.

As shown in FIG. 8, the tilt error signal TS becomes 0 when the tilting angle in the disk radial direction is 0° and has a typical linearity. Further its sign is inversed in response to the sign of the tilting angle and desired characteristics are obtained.

Figure 9:
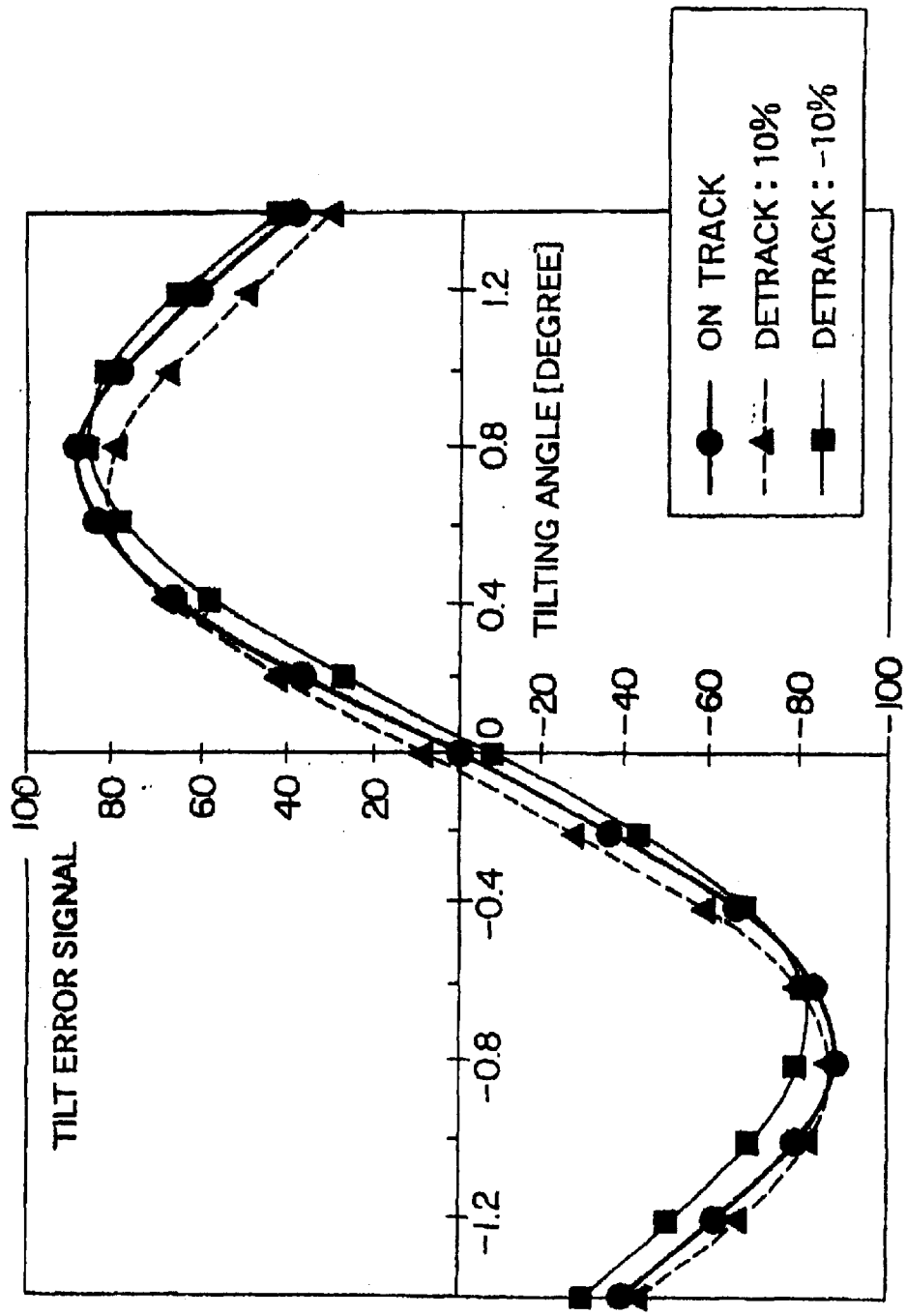
FIG. 9 is a view for explaining the relationship between the tilt error signal TS and the tilting angle when both the cases the tracking error is exist (detrack state) and is not exist (on track state)

FIG. 9 is a view for explaining the relationships between the tilt error signal TS and the tilting angle in the cases the tracking error exists (detrack state) and non-exists (on track state).

The black circles indicate the case the quantity of the detrack is 0.

The black triangles indicate the case the quantity of the detrack is 10% and the case the tracking error of about 10% of the size of the sub light spot occurs.

The black squares indicate the case the quantity of the detrack is −10% and the case the tracking error of about −10% of the size of the sub light spot occurs.

As shown in FIG. 9, In the tilt error signal TS, when the 10% of detrack occurs, the tilting angle in the disk radial direction changes about 0.05°, the ratio of the change is small, and the desired characteristic is obtained.

Figure 10:
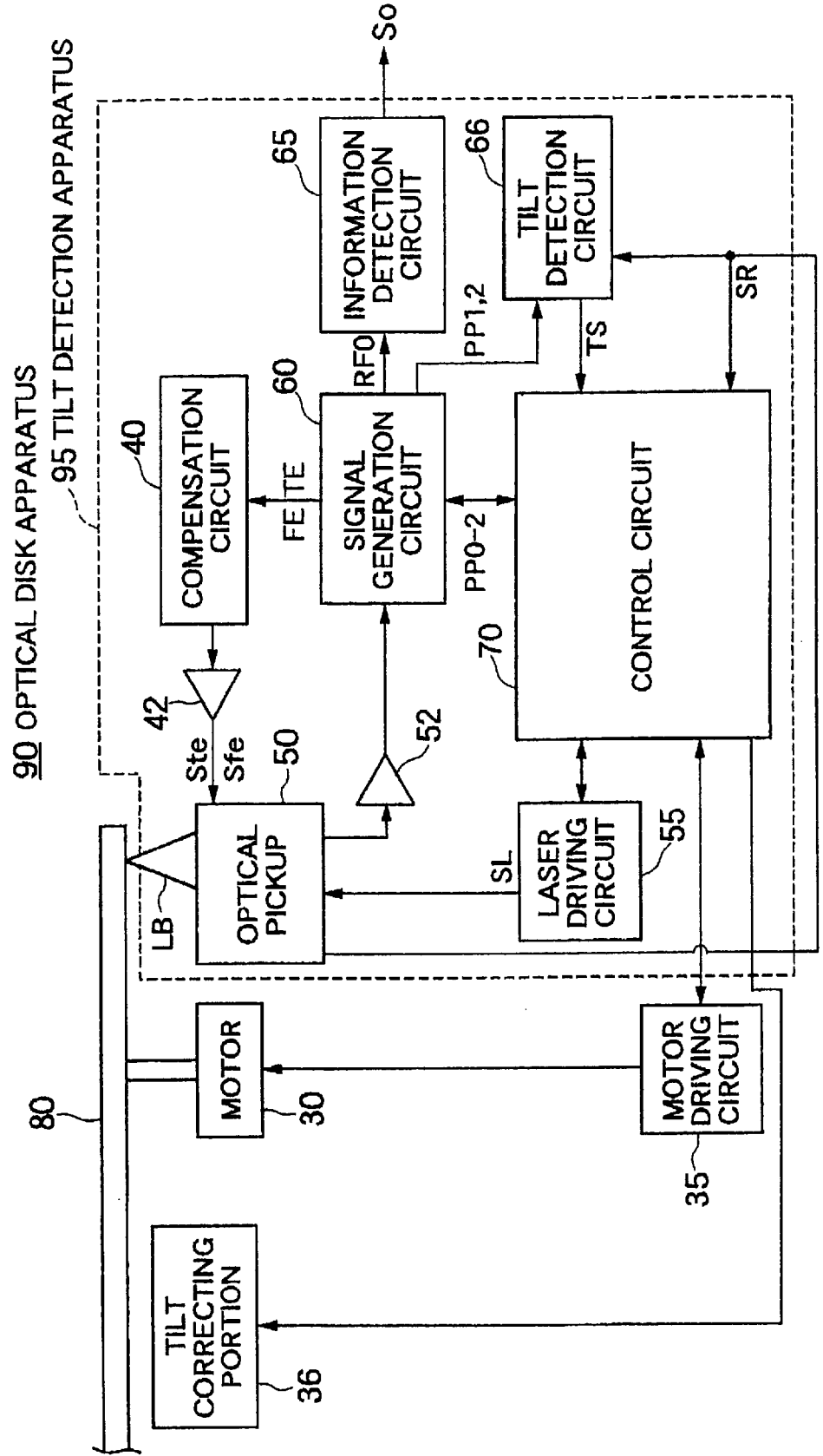
FIG. 10 is a block diagram showing an embodiment of the optical disk apparatus comprising the optical pickup shown in FIG. 5.

FIG. 10 is a block diagram showing the configuration of an embodiment of the optical disk apparatus comprising the optical pickup shown in FIG. 5.

This optical disk apparatus 90 comprises a motor 30, a motor driving circuit 35, a tilt correcting portion 36, a compensation circuit 40, an amplifier 42, an optical pickup 50, an amplifier (head amplifier) 52, a laser driving circuit 55, a signal generation circuit 60, an information detection circuit 65, a tilt detection circuit 66, and a control circuit 70. This optical disk apparatus 90 reproduces the recording information recorded on the optical disk 80.

Further, the optical disk apparatus 90 comprises an tilt detection apparatus 95. This tilt detection apparatus 95 comprises the compensation circuit 40, amplifier 42, the optical pickup 50, the amplifier 52, the laser driving circuit 55, the signal generation circuit 60, the information detection circuit 65, the tilt detection circuit 66, and the control circuit 70.

The control circuit 70 is a controller engaged in the controlling the whole of the optical disk apparatus 90 and includes, for example, a microcomputer.

This control circuit 70 controls the motor 30, the motor driving circuit 35, the laser driving circuit 55, the optical pickup 50, the compensation circuit 40, the information detection circuit 65, the tilt detection circuit 66 and so on.

The optical pickup 50 exposes the laser beam LB to the reproducing point of the optical disk 80 when reproducing.

The laser driving circuit 55 generates a driving signal SL under the control of the control circuit 70 and drives the semiconductor laser 4 in the optical pickup 50 by the driving signal to make the semiconductor laser 4 expose the laser beam LB.

The motor 30 is, for example, a spindle motor and rotates the optical disk 80 at the predetermined rotation velocity.

This motor 30 rotates the optical disk 80, or example, as the linear velocity becomes constant. speed.

The motor driving circuit 35 provides the driving power for the motor 30 to drive the motor 30. This motor driving circuit 35 may controls the rotation of the motor 30 by the PWM (Pulse Width Modulation) control and may controls it by the PLL (Phase Locked Loop) control.

The amplifier 52 amplifies each of the output signals SAu, SAd, SBu and SC–SF from the light receiving portions of the photodetector 8 comprised the optical pickup 50 to provide them for the signal generation circuit 60.

The signal generation circuit 60 generates a reproducing signal RF0 in response to the quantity of the reflected beam of the main laser beam, the push-pull signals PP1 and PP2 of the first and second sub laser beams, the focus error signal FE, and the tracking error signal TE based on the amplified output signals SAu, SAd, SBu, SBd, and SC–SF from the amplifier 52.

The signal generation circuit 60 generates the reproducing signal RF0 (=SAu+SAd+SBu+SBd) based on the sum of the output signals SAu, SAd, SBu, and SBd from the amplifier 52.

Further, it generates the push-pull signal PP1 (=SC–SD) based on the differences of the output signals SC and SD from the amplifier 52.

Further, it generates the push-pull signal PP1 (=SE–SF) based on the differences of the output signals SE and SF from the amplifier 52.

Further, the signal generation circuit 60 generates the focus error signal FE (=SAu+SBd–SAd–SBu) by the astigmatic method, for example, based on the difference of the output signals SAu, SAd, SBu, and SBd in the diagonal direction.

Note that, the signal generation circuit 60 generates the push-pull signal PP0 (=SAu+SAd–SBd–SBu) of the main laser beam and makes the push-pull signal PP0 the tracking error signal TE.

the compensation circuit 40 compensates the focus error signal FE and the tracking error signal TE (the phase compensation and/or the frequency compensation) to generate a compensation signal and provided the compensation signal for the amplifier 42.

The amplifier 42 amplifies the compensation signal of the focus error signal FE to generates the driving signal Sfe and provides it for the focusing actuator 2F in the optical pickup 50.

Further, the amplifier 42 amplifies the compensation signal of the tracking error signal TE to generates the driving signal Ste and provides it for the tracking actuator 2T in the optical pickup 50.

The tilt detection circuit 66 detects the tilt or the tilting angle based on the sum of the push-pull signals PP1 and PP2. Concretely, it generates a tilt error signal TS (=PP1+PP2) corresponding to the tilt angle based on the sum of the push-pull signals PP1 and PP2 and it provides the tilt error signal TS for the control circuit 70.

The information detection circuit 65 is provided the reproducing signal RF0 from the signal generation circuit 60, carries out the demodulation of the reproducing signal RF0 and so on, and outputs the reproduced recording information as an output signal So.

Further, the information detection circuit 65 detects an address of the optical disk 80 from the reproducing signal RF0 and reproduces the recording information based on the address.

The control circuit 70 generates a cross track signal CT (=PP1–PP2) based on the push-pull signals PP1 and PP2 and detects whether the position of the light spot of the main laser beam is on the track or not based on the signal CT. The cross track signal CT is referred, for example, when the light spot cross the track as seeking.

The tilt correcting portion 36 corrects the tilt of the optical disk 80. For example, the control circuit 70 controls the tilt correcting portion 36 based on the tilt error signal TS by the close loop control. The tilt correcting portion 36 corrects the tilt under the control of the control circuit 70 so that the tilt error signal TS becomes 0.

Figure 11:
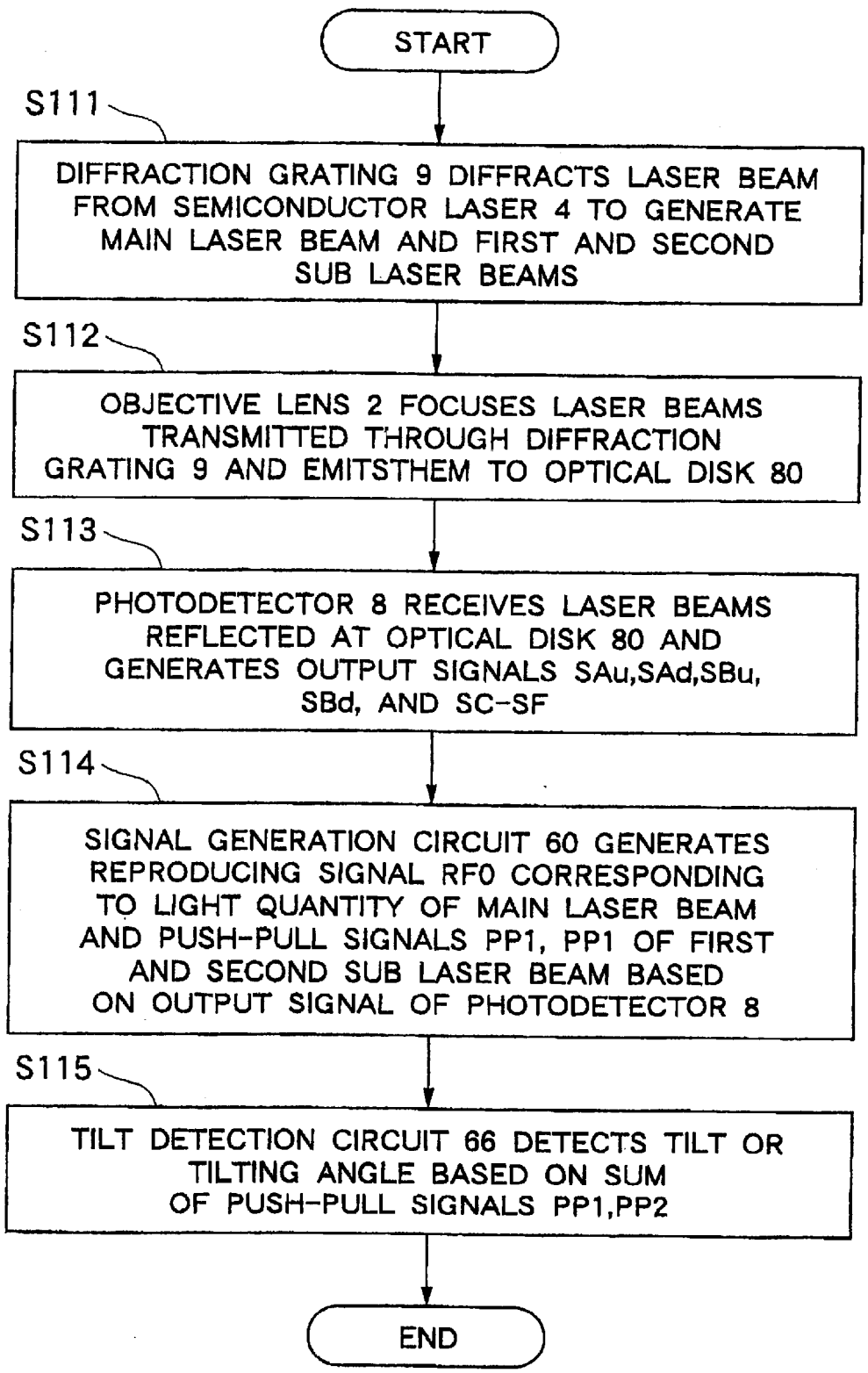
FIG. 11 is a flow-chart showing the detection method for detecting the tilt in the radial direction of the optical disk in the tilt detection apparatus of the optical disk apparatus.

FIG. 11 is a flow-chart showing the detection method for detecting the tilt in the radial direction of the optical disk 80 in the tilt detection apparatus 95 of the optical disk apparatus 90.

First, in the step S111, the diffraction grating 9 of the optical pickup 50 diffracts the laser beam from the semiconductor laser 4 to generate the main laser beam including the 0th order diffraction beam and first and second sub laser beams each including +-first diffraction beams.

The first ane second sub laser beams have a phase distribution equal to or substantially equal to the phase distribution due to the wave front aberration generated on the optical disk 80 when the optical disk 80 is tilted.

These laser beams (the main laser beam and the first and second sub laser beams) is provided for the objective lens 2 passing through the beam splitter 3.

In the step S112, the objective lens 2 collects laser beams (the main laser beam and the first and second sub laser beams) from the diffraction grating 9 to provide them to the optical disk 80 to expose the laser beams on the optical disk 80. The objective lens 2 collects the main laser beam to expose the track of the optical disk 80.

The main laser beam collected by the objective lens 2 are reflected at the optical disk 80, passes through the objective lens 2 again, and are provided the photodetector 8 passing through the beam splitter 3, the collecting lens 6, and the cylindrical lens 7.

In the step S113, the photodetector 8 receives the main laser beam and the first and second laser beam reflected at the optical disk 80 at the light receiving portions 8S0–8S2 to generate the output signals SAu, SAd, SBu, SBd, and SC–SF. Theses output signals are provided for the signal generation circuit 60 via the amplifier (head amplifier) 52.

In the step S114, the signal generation circuit 60 generates the reproducing signal RF in response to the quantity of the reflected main laser beam, the push-pull signals PP1 and PP2 of the first and second sub laser beams based on the output signals SAu, SAd, SBu, SBd, and SC–SF. Note that, the reproducing signal RF0 is provided for the information detection circuit 65 and the recording information is extracted.

In the step S115, the tilt detection circuit 66 detects the tilt or the tilting angle of the optical disk 80 based on the sum of the push-pull signals PP1 and PP2 of the first and second sub laser beams. Concretely, based on the sum of the push-pull signals PP1 and PP2, it generates the tilt error signal TS (=PP1+PP2) in response to the tilting angle of the optical disk 80.

The method for detecting the tilt of the optical disk as mentioned above is effective when the eccentricity of the optical disk is small.

When the eccentricity of the optical disk is large, the objective lens 2 is transferred in the disk radial direction in response to the eccentricity, the light spot on the light receiving portion is moved, and the offset occurs on the tilt error signal TS in response to the eccentricity.

For the above reason, it is preferable to remove the offset due to the eccentricity from the tilt error signal TS.

To remove the offset due to the eccentricity from the tilt error signal TS, another diffraction grating is added to the optical pickup 50. And predetermined operation is carried out using the diffraction beams generated by the added diffraction grating.

Figure 12:
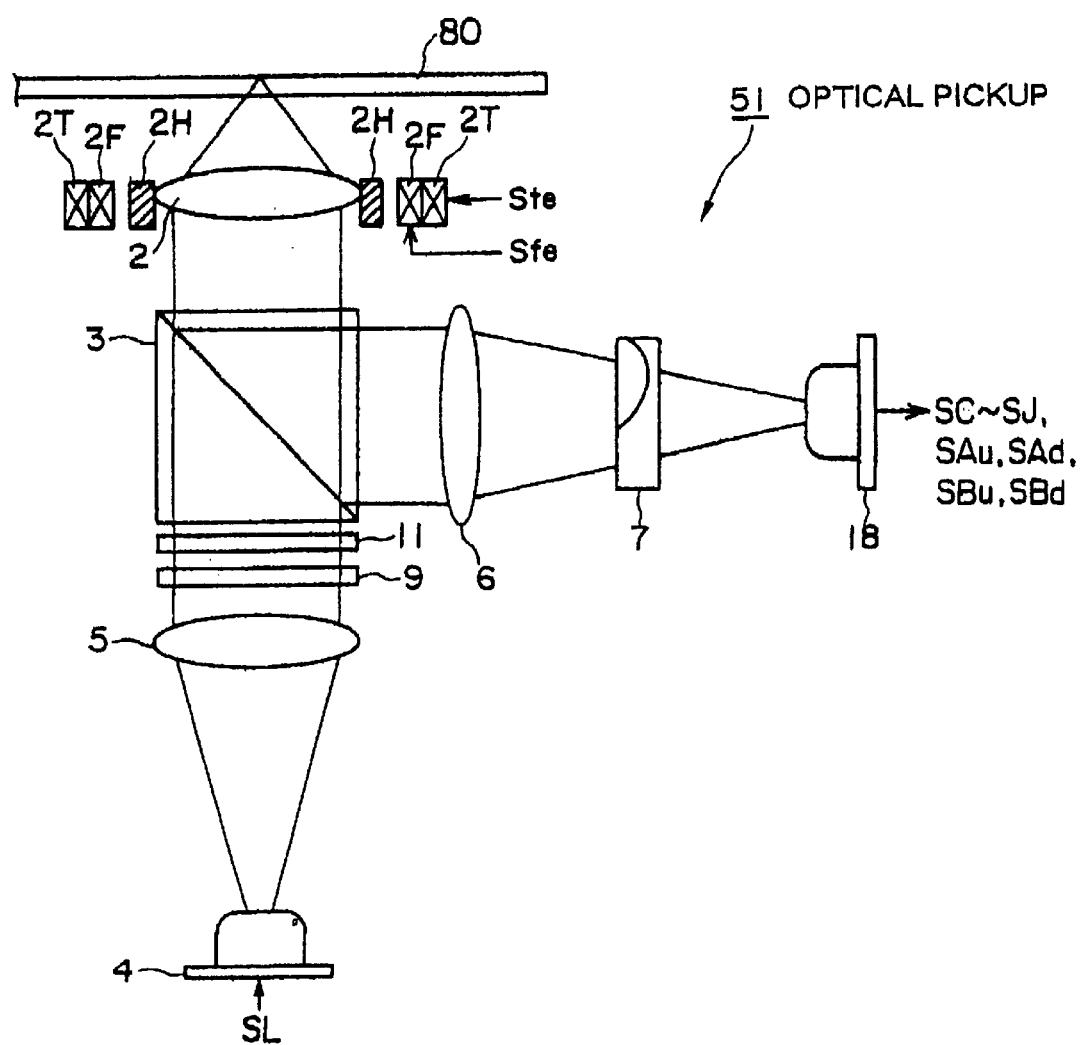
FIG. 12 is a view of the configuration of the optical pickup formed by adding the diffraction grating to the optical pickup.

FIG. 12 is a view of the configuration of the optical pickup 51 formed by adding the diffraction grating 11 to the optical pickup 50.

Further, in the optical pickup 51 shown in FIG. 12, the same portions as the optical pickup 50 shown in FIG. 5 are given the same references and the explanation of them are suitably omitted.

This optical pickup 51 comprises a semiconductor laser 4, a collimator lens 5, a diffraction grating 9, a diffraction grating 11, a beam splitter 3, an object lens 2, a collecting lens 6, cylindrical lens 7, a photodetector 18, lens holders 2H, a focusing actuator 2F and a tracking actuator 2T.

The semiconductor laser 4 outputs a linearly polarized laser beam based on the driving signal SL and provides it for the collimator lens 5.

The collimator lens 5 collimates the laser beam from the semiconductor laser 4 and provided it for the diffraction grating 9.

The diffraction grating 9 divides the laser beam from the collimator lens 5 into the main laser beam including 0th order diffraction beam and the first and second sub laser beams including +-first order diffraction beams and provides these laser beams (the main laser beam and the first and second sub laser beams) for the diffraction grating 11.

The diffraction grating 11 comprises, for example, a glass substrate on which straight and parallel grooves are formed and diffracts the laser beams from the diffraction grating 9. And then, it generates 0th order diffraction beam and +-first order diffraction beams of each of the laser beams to provide them for the beam splitter 3.

Concretely, the diffraction grating 11 generates a main laser diffraction beam which is a 0th order diffraction beam of the main laser beam from the diffraction grating 9 and third and forth sub laser diffraction beams which are +-first order diffraction beams of the main laser beam.

Further, the diffraction grating 11 generates a first sub laser diffraction beam which is a 0th order diffraction beam of the first sub laser beam from the diffraction grating 9 and +-first diffraction beams of the first sub laser beam.

Further, the diffraction grating 11 generates a second sub laser diffraction beam which is a 0th order diffraction beam of the second sub laser beam from the diffraction grating 9 and +-first diffraction beams of the second sub laser beam.

Further, the light intensities of the +-first diffraction beams of the first and second sub laser beams are as small as to ignore them in comparison with the main laser diffraction beam and the third and forth sub laser diffraction beams.

The beam splitter 3 passes through the laser beams from the diffraction grating 9 and 11 and provides them for the objective lens 2.

The objective lens 2 collects the laser beams from the beam splitter 3 and provides them for the optical disk 80 formed lands and/or grooves.

Further, the objective lens 2 returns the laser beams reflected at the optical disk 80 to the beam splitter 3.

The beam splitter 3, to which the laser beams from the objective lens 2 are exposed, reflects and outputs the exposed laser beams and provides them for the collecting lens 6.

The collecting lens 6 collects the laser beams from the beam splitter 3 and provides them for the cylinder-shaped lens (cylindrical lens) 7.

The cylindrical lens 7 passes through the laser beams from the collecting lens 6 and provides them for the photodetector 18.

The photodetector 18 receives the laser beams (the main laser diffraction beam and the first to forth sub laser diffraction beams) from the cylindrical lens 7 at the light receiving portion and generates output signals SAu, SAd, SBu, SBd, and SC–SJ.

Figure 13:
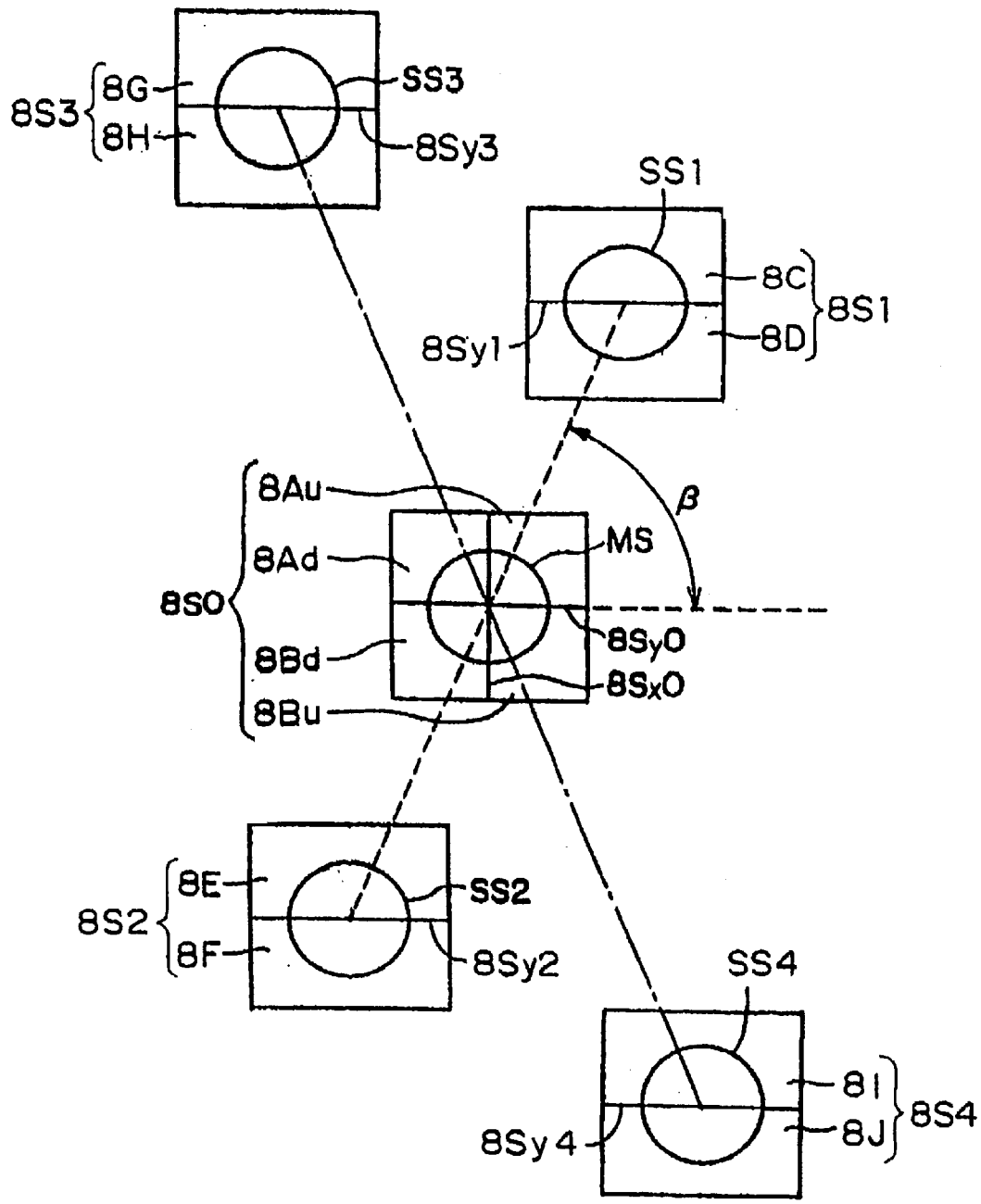
FIG. 13 is a view of the configuration of the light receiving portion of the photodetector shown in FIG. 12.
Figure 14:
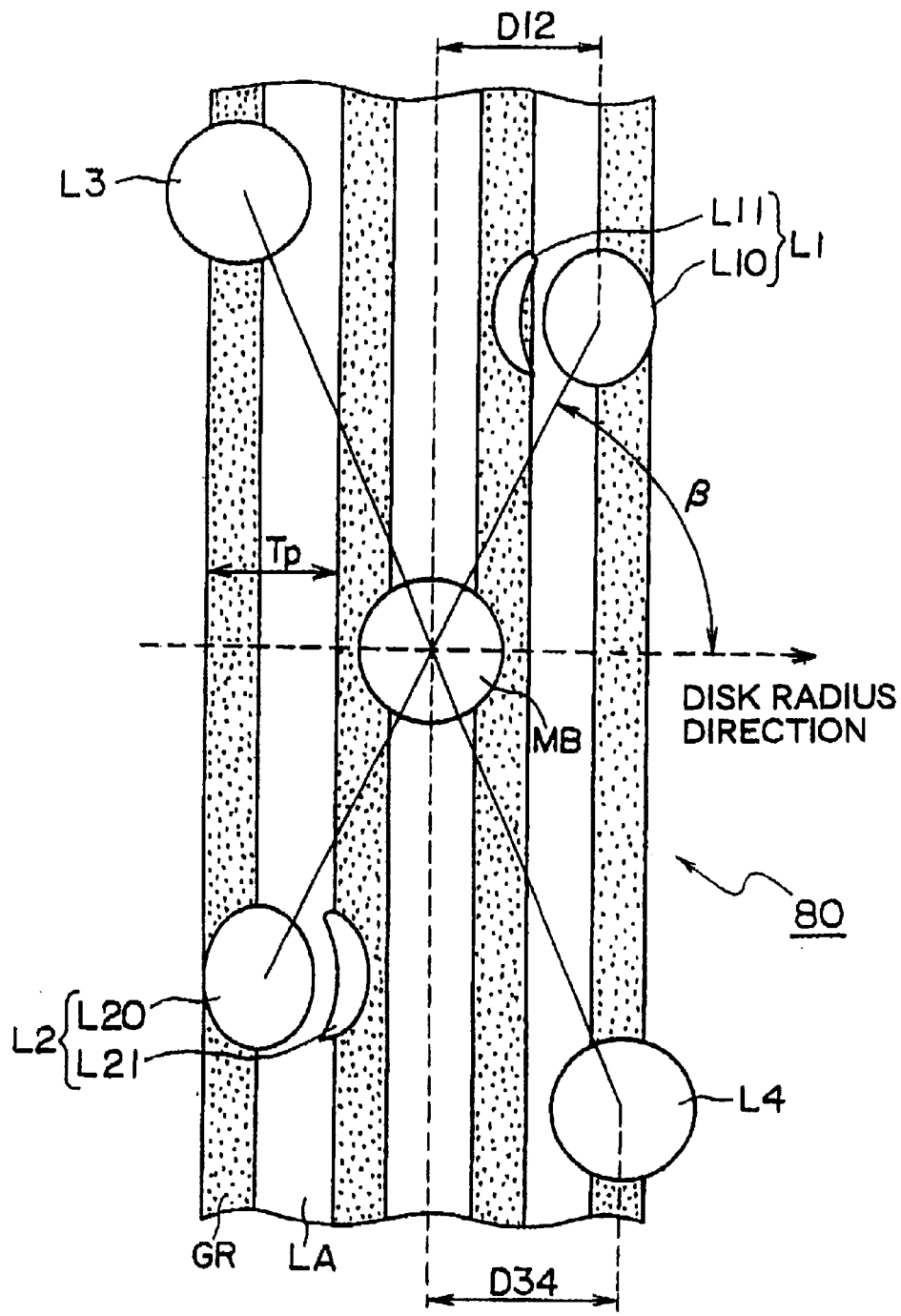
FIG. 14 is a view for explaining the arrangement of the light spots on the recording plane of the optical disk.

FIG. 13 is a view showing the configuration of the light receiving portion of the photodetector 18 shown in FIG. 12.

The photodetector 18 comprises a main light receiving portion 8S0 and the first and forth sub light receiving portions 8S1–8S4. Each of the light receiving portions 8S0–8S4 is divided in the direction in response to the track direction of the optical disk 80 as the push-pull signals in the disk radial direction or any signals in response to the push-pull signals are detectable.

The main light receiving portion 8S0 is divided into four of the same or approximately same parts by the two division lines 8Sx0, 8Sy0 crossing at right angle and comprises four division areas 8Au, 8Ad, 8Bu, 8Bd. In the main light receiving portion 8S0 shown in FIG. 13, the main light spot MS is formed by (the reflected light of) the main laser beam from the cylindrical lens 7.

The division area 8Au generates the output signal SAu in response to the light quantity (the reflected light quantity) of the main laser beam provided for the area 8Au.

The division area 8Ad generates the output signal SAd in response to the light quantity of the main laser beam provided for the area 8Ad.

The division area 8Bu generates the output signal SBu in response to the light quantity of the main laser beam provided for the area 8Bu.

The division area 8Bd generates the output signal SBd in response to the light quantity of the main laser beam provided for the area 8Bd.

The direction of the optical axis of the cylindrical lens 7 is at an angle of about 45° or about 135° to the direction of the division line 8Sx0 or the division line 8Sy0 of the main light receiving portion 8S0. The division line 8Sy0 (or the division line 8Sx0) of the main light receiving portion 8S0 for which the main laser diffraction beam reflected at the optical disk 80 is provided is parallel or approximately parallel to the track direction of the optical disk 80, and divides the main light receiving portion 8S0 into two of the same or approximately same parts.

The cross point of the division lines 8Sx0 and 8Sy0 is in the center part or in the approximately center part of the main laser diffraction beam passing through the cylindrical lens 7.

The shape of the light spot MS formed at the main light receiving portion 8S0 changes diagonally in accordance with the distance between the optical disk 80 and the objective lens 2, so that the focus eccentricity at the optical disk 80 is detectable based on the output signals SAu, SAd, SBu, and SBd generated by the division areas 8Au, 8Ad, 8Bu and 8Bd using the astigmatic method. Note that, the angle defined by the line formed by the light receiving portions 8S0–8S2 and the division line 8Sy0 corresponds to said direction p.

The first sub light receiving portion 8S1 is divided two of the same or approximately same parts by the division line 8Sy1 and comprises two division areas 8C, 8D. In the first sub light receiving portion 8S1 shown in FIG. 13, the sub light spot SS1 is formed by the first sub laser diffraction beam from the cylindrical lens 7.

The division area 8C generates the output signal SC in response to the light quantity (the reflected light quantity) of the sub laser diffraction beam provided for the area 8C. The division area 8D generates the output signal SD in response to the light quantity (the reflected light quantity) of the sub laser diffraction beam provided for the area 8D.

The center part of the first sub light receiving portion 8S1 is in the center or approximately center of the first sub laser diffraction beam passing through the cylindrical lens 7.

The second sub light receiving portion 8S2 is divided two of the same or approximately same parts by the division line 8Sy2 and comprises two division areas 8E, 8F. In the second sub light receiving portion 8S2 show in FIG. 13, the sub light spot SS2 is formed by (the reflected light of) the second sub laser diffraction beam from the cylindrical lens 7.

The division area 8E generates the output signal SE in response to the light quantity (the reflected light quantity) of the sub laser diffraction beam provided for the area 8E. The division area 8F generates the output signal SF in response to the light quantity (the reflected light quantity) of the sub laser diffraction beam provided for the area 8F.

The center part of the second sub light receiving portion 8S2 is in the center or approximately center of the second sub laser diffraction beam passing through the cylindrical lens 7.

The third sub light receiving portion 8S3 is divided two of the same or approximately same parts by the division line 8Sy3 and comprises two division areas 8G, 8H. In the third sub light receiving portion 8S3 show in FIG. 13, the sub light spot SS3 is formed by (the reflected light of) the third sub laser diffraction beam from the cylindrical lens 7.

The division area 8G generates the output signal SG in response to the light quantity (the reflected light quantity) of the sub laser diffraction beam provided for the area 8G. The division area 8H generates the output signal SH in response to the light quantity (the reflected light quantity) of the sub laser diffraction beam provided for the area 8G.

The center part of the third sub light receiving portion 8S3 is in the center or approximately center of the third sub laser diffraction beam passing through the cylindrical lens 7.

The forth sub light receiving portion 8S4 is divided two of the same or approximately same parts by the division line 8Sy4 and comprises two division areas 8I, 8J. In the forth sub light receiving portion 8S4 show in FIG. 13, the sub light spot SS4 is formed by (the reflected light of) the forth sub laser diffraction beam from the cylindrical lens 7.

The division area 8I generates the output signal SI in response to the light quantity (the reflected light quantity) of the sub laser diffraction beam provided for the area 8I. The division area 8J generates the output signal SJ in response to the light quantity (the reflected light quantity) of the sub laser diffraction beam provided for the area 8J.

The center part of the forth sub light receiving portion 8S4 is in the center or approximately center of the forth sub laser diffraction beam passing through the cylindrical lens 7. The division lines 8Sy0–8Sy4 are parallel or approximately parallel each other.

Figure 16:
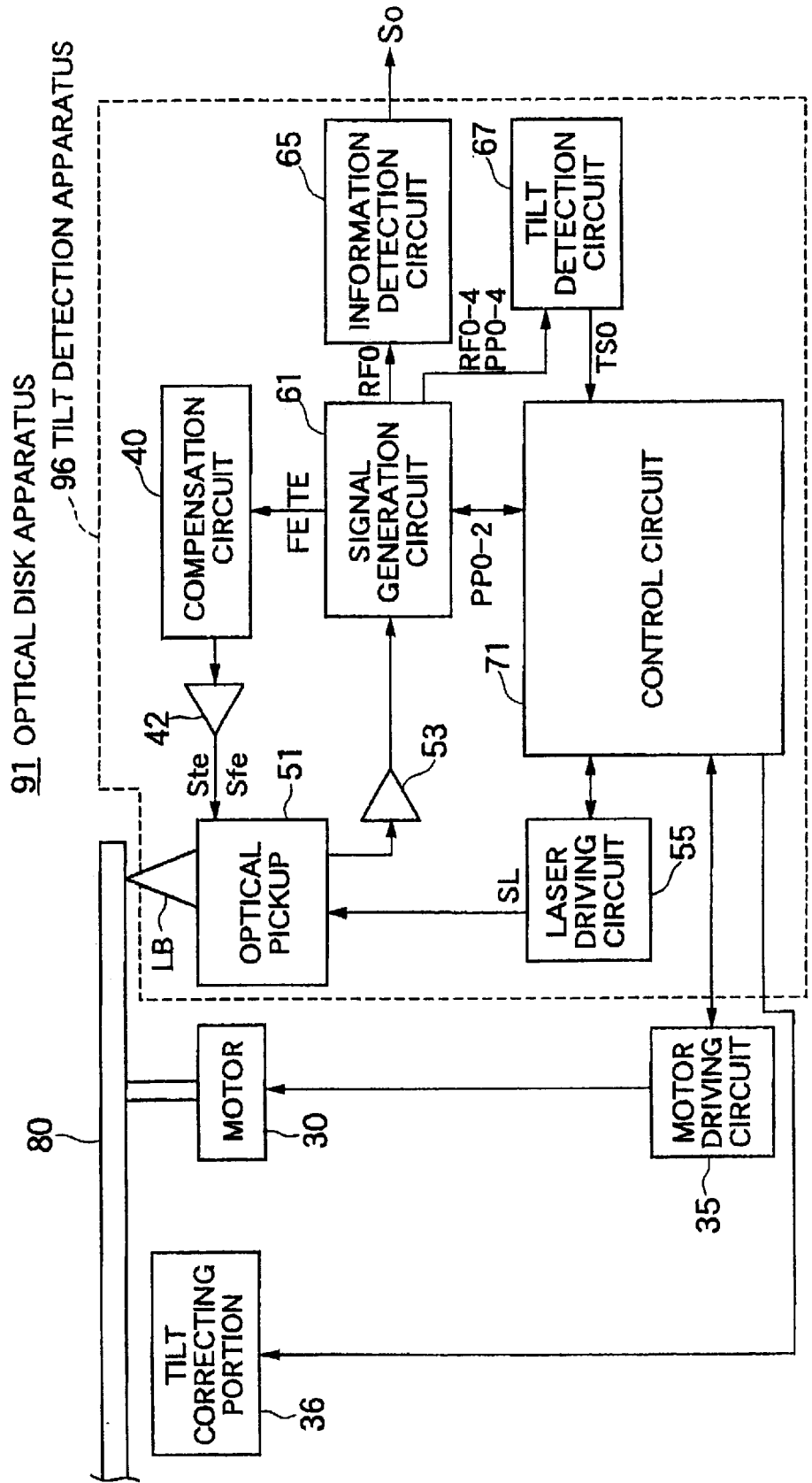
FIG. 16 is a block diagram showing the configuration of an embodiment of the optical disk apparatus comprising the optical pickup shown in FIG. 12.

FIG. 16 is a view for explaining the arrangement of the light spots on the recording side of the optical disk.

On the recording side of the optical disk 80, the land LA and the groove GR are formed and the groove GR forms a track guide groove.

On the recording side of the optical disk 80, the main light spot MB by the main laser diffraction beam having a large quantity of light and the first to forth sub light spot L1–L4 by the first to forth sub laser diffraction beams having a small quantity of light are formed.

The first sub light spot L1 comprises the spot L10 corresponding to the mainrobe and the spot L11 corresponding to the siderobe.

The second sub light spot L2 comprises the spot L20 corresponding to the mainrobe and the spot L21 corresponding to the siderobe.

The main laser diffraction beam is reflected at the main light spot MB and provided for the main light receiving portion 8S0 of the photodetector 18.

The first sub laser diffraction beam is reflected at the first sub light spot L1 and provided for the first sub light receiving portion 8S1 of the photodetector 18. The center of the sub laser diffraction beam reflected at the spot L1 is in the center or approximately center of the first sub light receiving portion 8S1.

The second sub laser diffraction beam is reflected at the second sub light spot L2 and provided for the second sub light receiving portion 8S2 of the photodetector 18. The center of the sub laser diffraction beam reflected at the spot L2 is in the center or approximately center of the second sub light receiving portion 8S2.

The third sub laser diffraction beam is reflected at the third sub light spot L3 and provided for the third sub light receiving portion 8S3 of the photodetector 18. The center of the sub laser diffraction beam reflected at the spot L3 is in the center or approximately center of the third sub light receiving portion 8S3.

The forth sub laser diffraction beam is reflected at the forth sub light spot L4 and provided for the forth sub light receiving portion 8S4 of the photodetector 18. The center of the sub laser diffraction beam reflected at the spot L4 is in the center or approximately center of the forth sub light receiving portion 8S4.

The light receiving portion 8S0–8S4 of the photodetector 18 have the configuration which can detects the push-pull signals in the disk radial direction by the division lines 8Sy0–8Sy4.

The distances from the main light spot MB to two of the sub light spots L1 and L2 on the optical disk 80 are same and determined by the angle a mentioned above.

Further, when the two sub light spots L1 and L2 are at the desired positions, the direction β is formed as the phase distribution, which are equal to or approximately equal to the phase distribution generated to the two sub light spots L1 and L2 by the tilt of the disk substrate in the disk radial direction, are given. Namely, the distances D12 from the center part of the main light spot MB to the center parts of the two sub light spots L1 and L2 in the disk radial direction is expressed in the equation (5) mentioned above by using the pitch Tp of the grooves GR and an integer n of 0 or more.

Further, the distances D34 from the center part of the main light spot MB to the center parts of the two sub light spot L3, L4 in the disk radial direction is expressed in the next equation (7) by using the pitch Tp of the grooves GR and an integer m of 0 or more.

$$D34 = (m + \tfrac{1}{2})Tp \tag{7}$$

Especially, in the case the land groove configuration whose ratio of the width of the land LA and groove GR is 1:1, the center parts of the sub light spots L1 and L2 are arranged at the center or approximately center of the groove GR.

The eccentricity signal RO in response to the eccentricity of the optical disk 80 is calculated by the next equation (8) based on the push-pull signal PP0 of the main laser diffraction beam and the push-pull signals PP3 and PP4 of the third and forth sub laser diffraction beams.

$$RO = SAu + SAd - SBu - SBd + k(SG - SH + SI - SJ) \quad (8)$$
$$= PP0 + k(PP3 + PP4)$$

In the above equation (8), by correcting the difference of the light intensity between the main spot MS of the main light receiving portion 8S0 and the sub spots SS3 and SS4 of the sub light receiving portion 8S3 and 8S4 by a coefficient k, the eccentricity signal RO can be detected because the polarity between the push-pull element PP0 and the push-pull element PP3 and PP4 is opposite. This correction coefficient k is expressed by the next equation (9).

$$k = (SAu + SAd + SBu + SBd)/(SG + SH + SI + SJ) \quad (9)$$
$$= RF0/(RF3 + RF4)$$

Therefore, by subtracting the signal (k0×RO) of the result of the multiplication of the eccentricity signal RO and a reasonable coefficient k0 from the tilt error signal TS, the tilt error signal TS0 removed the offset due to the eccentricity can be obtained.

This tilt error signal TS0 is expressed by the next equation (10).

$$TS0 = TS - k0 \times RO \quad (10)$$
$$= PP1 + PP2 - k0 \times (PP0 + k(PP3 + PP4))$$

Further, the correction coefficient k0 for correcting the light intensity of the main light spot MS and the sub light spots SS1 and SS2 is expressed by the next equation (11).

$$k0 = (SC + SD + SE + SF)/(2(SAu + SAd + SBu + SBd)) \quad (11)$$
$$= (RF1 + RF2)/(2 \times RF0)$$

Figure 15:
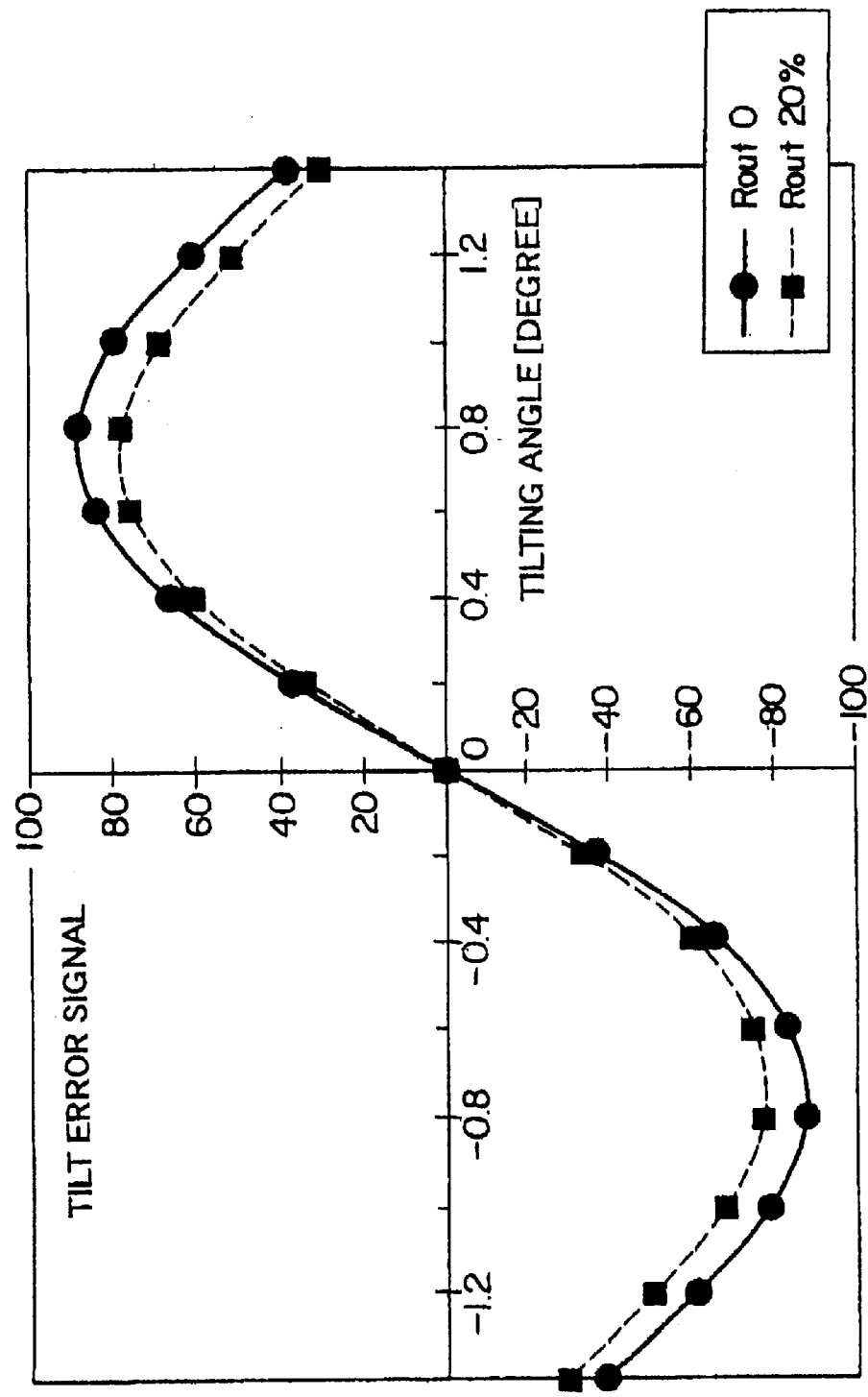
FIG. 15 is a view for explaining the relationship between the tilt error signal TS and the tilting angle when both the cases the tracking error is exist (detrack state) and is not exist (on track state)

FIG. 15 is a view for explaining the relationships between the tilt error signal TS and the tilting angle when the both cases the eccentricity exists and doesn't exist in accordance with the FIG. 8 and FIG. 9.

The black circles indicate the case the quantity of the eccentricity is 0.

The black squares indicate the case the quantity of the eccentricity is 20%, which is the case the eccentricity of about 20% of the size of the objective lens 2 occurs.

As shown in FIG. 15, even though the eccentricity occurs, the desired characteristic of the tilt error signal TS0 is obtained.

FIG. 16 is a block diagram showing the configuration of an embodiment of the optical disk apparatus comprising the optical pickup 51 shown in FIG. 12.

Further, in the optical disk apparatus 91 shown in FIG. 16, the same portions as the optical disk apparatus 90 shown in FIG. 10 are given the same references and the explanation of them are suitably omitted.

This optical disk apparatus 91 comprises a motor 30, a motor driving circuit 35, a tilt correcting portion 36, a compensation circuit 40, an amplifier 42, an optical pickup 51, an amplifier (head amplifier) 53, a laser driving circuit 55, a signal generation circuit 60, an information detection circuit 65, a tilt detection circuit 67, and a control circuit 71.

Further, the optical disk apparatus 91 comprises an tilt detection apparatus 96. This tilt detection apparatus 96 comprises the compensation circuit 40, the amplifier 42, the optical pickup 51, the amplifier 53, the laser driving circuit 55, the signal generation circuit 61, the information detection circuit 65, the tilt detection circuit 67, and the control circuit 71.

The control circuit 71 is a controller engaged in the controlling the whole of the optical disk apparatus 91 and includes, for example, a microcomputer.

This control circuit 71 controls the motor 30, the motor driving circuit 35, the laser driving circuit 55, the optical pickup 51, the compensation circuit 40, the signal generation circuit 61, the information detection circuit 65, the tilt detection circuit 67 and so on.

The optical pickup 51 exposes the laser beam LB to the reproducing point of the optical disk 80 when reproducing.

The laser driving circuit 55 generates a driving signal SL under the control of the control circuit 71 and drives the semiconductor laser 4 in the optical pickup 51 by the driving signal to make the semiconductor laser 4 expose the laser beam LB.

The amplifier 53 amplifies each of the output signals SAu, SAd, SBu, SBd and SC–SJ from the light receiving portions of the photodetector 18 comprised the optical pickup 51 to provide them for the signal generation circuit 61.

The signal generation circuit 61 generates a reproducing signal RF0 in response to the quantity of the reflected beam of the main laser diffraction beam and reproducing signals RF1–RF4 in response to the quantity of the reflected beams of the first to forth sub laser diffraction beams based on the amplified output signals SAu, SAd, SBu, SBd, and SC–SJ from the amplifier 53.

Further, the signal generation circuit 61 generates the push-pull signal PP0 of the main laser diffraction beam and the push-pull signals PP1–PP4 of the first to forth sub laser diffraction signals.

Further, the signal generation circuit 61 generates the focus error signal FE and the tracking error signal TE.

The signal generation circuit 61 generates the reproducing signal RF0 (=SAu+SAd+SBu+SBd) based on the sum of the output signals SAu, SAd, SBu, and SBd from the amplifier 53.

Further, it generates the reproducing signal RF1 (=SC+SD) based on the output signals SC and SD.

Further, it generates the reproducing signal RF2 (=SE+SF) based on the output signals SE and SF.

Further, it generates the reproducing signal RF3 (=SG+SH) based on the output signals SG and SH.

Further, it generates the reproducing signal RF4 (=SI+SJ) based on the output signals SI and SJ.

Further, the signal generation circuit 61 generates the push-pull signal PP0 (=SAu+SAd−SBu−SBd), for example, based on the difference of the output signals SAu, SAd and the output signals SBu, SBd from the amplifier 53.

Further, it generates the push-pull signal PP1 (=SC−SD) based on the difference of the output signal SC and SD.

Further, it generates the push-pull signal PP2 (=SE−SF) based on the difference of the output signal SE and SF.

Further, it generates the push-pull signal PP3 (=SG−SH) based on the difference of the output signal SG and SH.

Further, it generates the push-pull signal PP4 (=SI−SJ) based on the difference of the output signal SI and SJ.

Further, the signal generation circuit 61 generates the focus error signal FE (=SAu+SBd−SAd−SBu) by the astigmatic method, for example, based on the difference of the output signals SAu, SAd, SBu, and SBd from the amplifier 53 in the diagonal direction.

Note that, the signal generation circuit 61 makes the push-pull signal PP0 the tracking error signal TE.

The tilt detection circuit 67 detects the tilt or the tilting angle based on the sum of the push-pull signals PP1 and PP2 and the eccentricity element. Concretely, it generates a tilt error signal TS0 corresponding to the tilt angle based on the difference of the sum of the push-pull signals PP1 and PP2 and the eccentricity signal RO and it provides the generated tilt error signal TS0 for the control circuit 71.

The information detection circuit 65 is provided the reproducing signal RF0 from the signal generation circuit 61, carries out the demodulation of the reproducing signal RF0 and so on to reproduce the recording information of the optical disk 80, and outputs the reproduced recording information as an output signal So.

Further, the information detection circuit 65 detects an address of the optical disk 80 from the reproducing signal RF0 and reproduces the recording information based on the address.

The control circuit 71 generates a cross track signal CT (=PP1−PP2) based on the push-pull signals PP1 and PP2 and detects whether the position of the light spot of the main laser beam is on the track or not based on the signal CT. The cross track signal CT is referred, for example, when the light spot cross the track as seeking.

The tilt correcting portion 36 corrects the tilt of the optical disk 80. For example, the control circuit 71 controls the tilt correcting portion 36 based on the tilt error signal TS0 by the close loop control. The tilt correcting portion 36 corrects the tilt under the control of the control circuit 71 so that the tilt error signal TS becomes 0.

FIG. 17 is a flow-chart showing the detection method for detecting the tilt in the radial direction of the optical disk 80 in the tilt detection apparatus 96 of the optical disk apparatus 91.

First, in the step S121, the diffraction grating 9 of the optical pickup 51 diffracts the laser beam from the semiconductor laser 4 to generate the main laser beam including a 0th order diffraction beam and first and second sub laser beams each including +-first diffraction beams.

Each of the first and second sub laser beams have a phase distribution equal to or substantially equal to the phase distribution due to the wave front aberration generated on the optical disk 80 when the optical disk 80 is tilted.

These laser beams (the main laser beam and the first and second sub laser beams) are provided for the diffraction grating 11.

In the step S122, the diffraction grating 11 diffracts the main laser beam from the diffraction grating 9 to generate the main laser diffraction beam including a 0th order diffraction beam and third and forth sub laser diffraction beams each including +-first diffraction beam.

Further, the diffraction grating 11 diffracts the first sub laser beam from the diffraction grating 9 to generate the first laser diffraction beam including a 0th order diffraction beam and diffracts the second sub laser beam from the diffraction grating 9 to generate the second laser diffraction beam including a 0th order diffraction beam.

These laser beams (the main laser diffraction beam and the first to forth sub laser diffraction beams) are provided for the objective lens 2 passing through the beam splitter 3.

Note that, each of the first and second sub laser diffraction beam has a phase distribution equal to or approximately equal to the phase distribution due to the wave front aberration generated on the optical disk 80 when the optical disk 80 is tilted.

In the step S123, the objective lens 2 collects laser beams (the main laser diffraction beam and the first to forth sub laser diffraction beams) from the diffraction grating 9 and 11 and provides them to the optical disk 80 to expose the laser beams on the optical disk 80. The objective lens 2 collects the main laser diffraction beam to expose the track of the optical disk 80.

The main laser beam collected by the objective lens 2 are reflected at the optical disk 80, passes through the objective lens 2 again, and are provided for the photodetector 18 passing through the beam splitter 3, the collecting lens 6, and the cylindrical lens 7.

In the step S124, the photodetector 18 receives the main laser diffraction beam and the first to forth laser diffraction beams reflected at the optical disk 80 at the light receiving portions 8S0–8S4 to generate the output signals SAu, SAd, SBu, SBd, and SC–SJ. Theses output signals are provided for the signal generation circuit 61 via the amplifier (head amplifier) 53.

In the step S125, the signal generation circuit 61 generates the reproducing signals RF0 and RF1–RF4 in response to the quantities of the reflected main laser diffraction beam and the first to forth sub laser diffraction beams based on the output signals SAu, SAd, SBu, SBd and SC–SJ.

Further, the signal generation circuit 61 generates the push-pull signals PP0 and PP1–PP4 of the main laser diffraction beam and the first to forth sub laser diffraction beams.

In the step S126, the tilt detection circuit 67 detects the tilt or the tilting angle of the optical disk 80 based on the difference of the push-pull signals PP1 and PP2 and the first and second sub laser diffraction beams and the eccentricity signal RO. Concretely, the tilt error signal TS0 (=PP1+PP2−k0×RO) corresponding to the tilting angle of the optical disk 80 is generated based on the difference of the push-pull signals PP1 and PP2 and the eccentricity signal RO.

The optical pickup 51 with the configuration as mentioned above can detect the tilt of the optical disk when the optical disk is eccentric.

Note that, the present invention is not limited to the above embodiments and includes modifications within the scope of the claims.

For example, in the optical pickup 51, the diffraction grating 9 and the diffraction grating 11 the arrangement may be replaced each other.

Further, in the tilt detection apparatus 95 shown in FIG. 10, the tilt detection circuit 66 may be formed like that it detects the eccentricity signal RQ in response to the eccentricity of the optical disk 80 based on the detection signal SR from the center point sensor 12 of the optical pickup 50, generates the tilting error signal TS' based on the difference of the sum of the push-pull signals PP1 and PP2 and the eccentricity signal RQ, and provides the tilt error signal TS' for the control circuit 70.

For example, it extracts the frequency element in response to the rotation period of the optical disk 80 from the detection signal SR and generates the eccentricity signal RQ based on the extracted frequency element.

In this case, the step of generating the eccentricity signal RQ is included in the flow-chart shown in FIG. 11, and in the step S115 the tilt detection circuit 65 detects the tilt or the tilting angle based on the difference of the sum of the push-pull signals PP1 and PP2 and the eccentricity signal RQ.

As explained above, according to the present invention, the tilt detection apparatus and tilt detection method detectable the tilt of the optical disk using the diffraction beams, the optical pickup can be applied to the tilt detection apparatus, and the optical disk apparatus can be provided.

What is claimed is:

1. An optical pickup, comprising:

a laser configured to output a laser beam;

a diffraction grating configured to diffract the laser beam from said laser to generate a 0th order diffraction beam and +-first order diffraction beams which have a phase distribution equal to or substantially equal to a phase distribution due to a wave front aberration generated on an optical disk when the optical disk is tilted;

an objective lens configured to collect said 0th order diffraction beam and said +-first order diffraction beams and exposing the beams to the optical disk on which track guide grooves are formed; and a photodetector configured to generate signals corresponding to said +-first order diffraction beams reflected at said optical disk, wherein;

said exposing step has the steps of collecting said 0th order diffraction beam and +-first order diffraction beams and exposing said 0th order diffraction beam to the track of said optical disk, and a distance from the center part of the optical spot of said 0th order diffraction beam to the center part of the optical spot of said +-first order diffraction beams in the disk radial direction is, where n is an integer of 0 or more, equal to or approximately equal to a $(n/2+\frac{1}{4})$ times of the pitch of said track or said track guide groove.

2. An optical pickup as set forth in claim 1, wherein; said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

3. An optical pickup as set forth in claim 1, further comprising;

an actuator configured to move said objective lens in the disk radial direction in response to an eccentricity of said optical disk, and a position sensor configured to detect the quantity of movement or the quantity of change of said objective lens in the disk radial direction.

4. An optical pickup, comprising:

a laser configured to output a laser beam;

a first diffraction grating configured to diffract the laser beam from said laser to generate a main laser beam including a 0th order diffraction beam and first and second sub laser beams including one of +-first order diffraction beams;

a second diffraction grating configured to diffract said main laser beam to generate a main laser diffraction beam including a 0th order diffraction beam and third and fourth sub laser diffraction beams including one of +-first order diffraction beams and diffracting said first and second sub laser beams to generate first and second sub laser diffraction beams including a 0th order diffraction beam;

an objective lens configured to collect said main laser diffraction beams and said first to fourth sub laser diffraction beams and exposing the beams to an optical disk on which track guide grooves are formed; and a photodetector configured to generate signals in response to said main laser diffraction beams and said first to fourth sub laser diffraction beams reflected at said optical disk, and wherein each of said first and second sub laser diffraction beams exposed to said optical disk has a phase distribution equal to or substantially equal to a phase distribution due to a wave front aberration generated on said optical disk when said optical disk is tilted.

5. An optical pickup as set forth in claim 4, wherein;

said objective lens collects said main laser diffraction beam and exposes it to the track of said optical disk, and distance from the center part of the optical spot of said main laser diffraction beam to the center part of the optical spot of said first and second sub laser diffraction beams in the disk radial direction is, where n is an integer of 0 or more, equal to or approximately equal to a $(n2+\frac{1}{4})$ times of the pitch of said track or said track guide groove.

6. An optical pickup as set forth in claim 4, wherein a distance from the center part of the optical spot of said main laser diffraction beam to the center part of the optical spot of said third and fourth sub laser diffraction beams in the disk radial direction is, when m is an integer of 0 or more, equal to or approximately equal to a $(m+\frac{1}{2})$ times of the pitch of said track or said track guide groove.

7. An optical pickup as set forth in claim 4, wherein;

said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

8. An optical pickup as set forth in claim 4, wherein said wave front aberration is the coma aberration generated at a transparency substrate of said optical disk.

9. A tilt detection apparatus, comprising:

a laser configured to output a laser beam;

a diffraction grating configured to diffract the laser beam from said laser to generate a 0th order diffraction beam and +-first order diffraction beams;

an objective lens configured to collect said 0th order diffraction beam and +-first order diffraction beams and exposing the beams to an optical disk on which track guide grooves are formed;

a generating circuit configured to generate push-pull signals of said +-first order diffraction beams reflected at said optical disk; and a detection circuit configured to detect a tilt of said optical disk based on the sum of the push-pull signals of said +-first order diffraction beams, wherein each of said +-first order diffraction beams exposed to said optical disk has a phase distribution equal to or substantially equal to a phase distribution due to a wave front aberration generated on said optical disk when said optical disk is tilted, wherein said exposing step has the steps of collecting said 0th order diffraction beam and +-first order diffraction beams and exposing said 0th order diffraction beam to the track of said optical disk, and a distance from the center part of the optical spot of said 0th order diffraction beam to the center part of the optical spot of said +-first order diffraction beams in the disk radial direction is, where n is an integer of 0 or more, equal to or approximately equal to a $(n/2+\frac{1}{4})$ times of the pitch of said track or said track guide groove.

10. A tilt detection apparatus as set forth in claim 9, wherein;

said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

11. A tilt detection apparatus as set forth in claim 9, further comprising:

a photodetector, and wherein;

said photodetector comprises light receiving portions configured to receive each of said +-first order diffraction beams reflected at said optical disk, and each of said light receiving portions is divided in the direction in response to the track direction on said optical disk, and said generating circuit generates the push-pull signals of said +-first order diffraction beams based on the output signals from said light receiving portions of said photodetector.

12. A tilt detection apparatus as set forth in claim 9, further comprising:

an actuator configured to move said objective lens in the disk radial direction in response to an eccentricity of said optical disk; and a position sensor configured to detect the quantity of movement or the quantity of change of said objective lens, and wherein said detection circuit generates an eccentricity signal in response to the eccentricity of said optical disk based on said quantity of movement or the quantity of change detected by said position sensor and detecting a tilt of said optical disk based on the deference between the sum of the push-pull signals of said +-first order diffraction beams and said eccentricity signal.

13. A tilt detection apparatus, comprising:

a laser configured to output a laser beam;

a first diffraction grating configured to diffract the laser beam from said laser to generate a main laser beam including a 0th order diffraction beam and first and second sub laser beams including one of +-first order diffraction beams;

a second diffraction grating configured to diffract said main laser beam to generate a main laser diffraction beam including a 0th order diffraction beam and third and fourth sub laser diffraction beams including one of +-first order diffraction beams and diffracting said first and second sub laser beams to generate first and second sub laser diffraction beams including a 0th order diffraction beam;

an objective lens configured to collect said main laser diffraction beam and said first to fourth sub laser diffraction beams and exposing the beams to an optical disk on which track guide grooves are formed;

a generating circuit configured to generate push-pull signals of said main laser diffraction beam and said first to fourth sub laser diffraction beams reflected at said optical disk; and a detection circuit configured to generate an eccentricity signal in response to the eccentricity of said optical disk based on the push-pull signals of said main laser diffraction beam and said third and fourth sub laser diffraction beams and detecting a tilt of said optical disk based on the deference between the sum of the push-pull signals of said first and second sub laser diffraction beams and said eccentricity signal, and wherein each of said first and second sub laser diffraction beams exposed to said optical disk has a phase distribution equal to or substantially equal to a phase distribution due to a wave front aberration generated on said optical disk when said optical disk is tilted.

14. A tilt detection apparatus as set forth in claim 13, wherein;

said objective lens collects said main laser diffraction beam and exposes it to the track of said optical disk, and a distance from the center part of the optical spot of said man laser diffraction beam to the center part of the optical spot of said first and second sub laser diffraction beams in the disk radial direction is, where n is an integer of 0 or more, equal to or approximately equal to a (n/2+¼) times of the pitch of said track or said track guide groove.

15. A tilt detection apparatus as set forth in claim 13, wherein a distance from the center part of the optical spot of said main laser diffraction beam to the center part of the optical spot of said third and fourth sub laser diffraction beams in the disk radial direction is, when m is an integer of 0 or more, equal to or approximately equal to a (m+½) times of the pitch of said track or said track guide groove.

16. A tilt detection apparatus as set forth in claim 13, wherein;

said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

17. A tilt detection apparatus as set forth in claim 13, further comprising a photodetector, and wherein;

said photodetector comprises light receiving portions configured to receive each of said main laser diffraction beam and said first to fourth sub laser diffraction beams reflected at said optical disk, and each of said light receiving portions is divided in the direction in response to the track direction on said optical disk, and said generating circuit generates the push-pull signals of said main laser diffraction beam and said first to fourth sub laser diffraction beams based on the output signals from said light receiving portions of said photodetector.

18. A tilt detection method, comprising the steps of:

diffracting a laser beam to generate a 0th order diffraction beam and +-first order diffraction beams and exposing said generated 0th order diffraction beam and +-first order diffraction beams to an optical disk on which the track guide grooves are formed;

generating push-pull signals of said +-first order diffraction beams reflected at said optical disk; and detecting the tilt of said optical disk based on the sum of the push-pull signals of said +-first order diffraction beams, and wherein each of said +-first order diffraction beams reflected at said optical disk has a phase distribution equal to or substantially equal to a phase distribution due to a wave front aberration generated on said optical disk when said optical disk is tilted, wherein said exposing step has the steps of collecting said 0th order diffraction beam and +-first order diffraction beams and exposing said 0th order diffraction beam to the track of said optical disk, and a distance from the center part of the optical spot of said 0th order diffraction beam to the center part of the optical spot of said +-first order diffraction beams in the disk radial direction is, where n is an integer of 0 or more, equal to or approximately equal to a $(n/2+¼)$ times of the pitch of said track or said track guide groove.

19. A tilt detection method as set forth in claim 18, wherein;

said phase distribution of one of said +-first order diffraction beams is a phase distribution generated when the tilting angle of said optical disk is a positive constant angle, and said phase distribution of another of said +-first order diffraction beams is a phase distribution generated when the tilting angle of said optical disk is a negative constant angle.

20. A tilt detection method as set forth in claim 18, further comprising the step of generating an eccentricity signal in response to the eccentricity of said optical disk, and wherein said detecting step has a step of detecting the tilt of said optical disk based on the difference between the sum of the push-pull signals of said +-first order diffraction beams and said eccentricity signal.

21. A tilt detection method, comprising the steps of:

diffracting the laser beam to generate a main laser beam including a 0th order diffraction beam and first and second sub laser beams including one of +-first order diffraction beams;

diffracting said main laser beam to generate a main laser diffraction beam including a 0th order diffraction beam and third and fourth sub laser diffraction beams including one of +-first order diffraction beams and diffracting said first and second sub laser beams to generate first and second sub laser diffraction beams including a 0th order diffraction beam;

exposing said main laser diffraction beam and said first to fourth sub laser diffraction beams to an optical disk on which track guide grooves are formed;

generating push-pull signals of said main laser diffraction beam and said first to fourth sub laser diffraction beams reflected at said optical disk; and generating an eccentricity signal in response to the eccentricity of said optical disk based on the push-pull signals of said main laser diffraction beam and said third and fourth sub laser diffraction beams and detecting a tilt of said optical disk based on the deference between the sum of the push-pull signals of said first and second sub laser diffraction beams and said eccentricity signal, and wherein each of said first and second sub laser diffraction beams exposed to said optical disk has a phase distribution equal to or substantially equal to a phase distribution due to a wave front aberration generated on said optical disk when said optical disk is tilted.

22. A tilt detection method as set forth in claim 21, wherein;

said exposing step has a step of collecting said main laser diffraction beam and said first to fourth sub laser diffraction beams and exposing said main laser diffraction beams to the track of said optical disk, and a distance from the center part of the optical spot of said main laser diffraction beam to the center part of the optical spot of said first and second sub laser diffraction beams in the disk radial direction is, where n is an integer of 0 or more, equal to or approximately equal to a $(n/2+¼)$ times of the pitch of said track or said track guide groove.

23. A tilt detection method as set forth in claim 22, wherein a distance from the center part of the optical spot of said main laser diffraction beam to the center part of the optical spot of said third and fourth sub laser diffraction beams in the disk radial direction is, when m is an integer of 0 or more, equal to or approximately equal to a $(m+½)$ times of the pitch of said track or said track guide groove.

24. A tilt detection method as set forth in claim 21, wherein;

said phase distribution of one of said first or second sub laser diffraction beams is a phase distribution generated when the tilting angle of said optical disk is a positive constant angle, and said phase distribution of another of said first or second sub laser diffraction beams is a phase distribution generated when the tilting angle of said optical disk is a negative constant angle.

25. An optical disk apparatus, comprising:

an optical pickup configured to diffract a laser beam from a laser, generating a 0th order diffraction beam and +-first order diffraction beams having a phase distribution equal to or approximately equal to a phase distribution due to a wave front aberration of an optical disk when the optical disk is tilted, exposing the 0th order diffraction beam and +-first order diffraction beams to the optical disk, and receiving reflected beams of said exposed beams from the optical disk to generate signals in response to each of the reflected signals;

a signal generation circuit configured to generate push-pull signals of said received reflected beams of at least said +-first order diffraction beams;

a tilt detection circuit configured to detect the tilt of the optical disk based on the sum of said generated push-pull signals of said +-first order diffraction beams; and a tilt correction portion configured to correct the tilt of the optical disk in response to said detected tilt, wherein said optical pickup device is further configured to collect said 0th order diffraction beam and +-first order diffraction beams and expose said 0th order diffraction beam to the track of said optical disk, where a distance from the center part of the optical spot of said 0th order diffraction beam to the center part of the optical spot of said +-first order diffraction beams in the disk radial direction is, where n is an integer of 0 or more, equal to or approximately equal to a $(n/2+¼)$ times of the pitch of said track or said track guide groove.

* * * * *

UNITED STATES PATENT AND TRADEMARK OFFICE
CERTIFICATE OF CORRECTION

PATENT NO. : 6,829,205 B2
DATED : December 7, 2004
INVENTOR(S) : Atsushi Fukumoto It is certified that error appears in the above-identified patent and that said Letters Patent is hereby corrected as shown below:

Column 12,
Lines 34 and 49, change "show" to -- shown --.

Column 13,
Line 63, delete "8S2".

Column 15,
Line 1, change "or" to -- for --.

Column 18,
Line 60, change "p" to -- $\beta$ --.

Column 19,
Line 11, change "show" to -- shown --.

Column 27,
Line 35, change "deference" to -- difference --.

Column 28,
Line 1, change "deference" to -- difference --.

Column 29,
Line 52, change "deference" to -- difference --.

Signed and Sealed this

Fifth Day of July, 2005

JON W. DUDAS
*Director of the United States Patent and Trademark Office*